US010437070B2

(12) United States Patent
Pombo et al.

(10) Patent No.: US 10,437,070 B2
(45) Date of Patent: Oct. 8, 2019

(54) INTERCHANGEABLE OPTICS FOR A HEAD-MOUNTED DISPLAY

(71) Applicant: RealWear, Incorporated, Milpitas, CA (US)

(72) Inventors: Stephen A. Pombo, Campbell, CA (US); George Henry Hines, San Francisco, CA (US); Christopher Iain Parkinson, Richland, WA (US); Sanjay Subir Jhawar, Menlo Park, CA (US); Kenneth Lustig, Mercer Island, WA (US)

(73) Assignee: RealWear, Inc., Vancouver, WA (US)

( * ) Notice: Subject to any disclaimer, the term of this patent is extended or adjusted under 35 U.S.C. 154(b) by 0 days.

(21) Appl. No.: 15/390,363

(22) Filed: Dec. 23, 2016

(65) Prior Publication Data
US 2018/0180894 A1 Jun. 28, 2018

(51) Int. Cl.
*G02B 27/01* (2006.01)
*G06F 1/16* (2006.01)
(Continued)

(52) U.S. Cl.
CPC ............ *G02B 27/0176* (2013.01); *A42B 3/04* (2013.01); *G02B 27/0172* (2013.01); *G02B 27/0179* (2013.01); *G06F 1/163* (2013.01); *G06F 3/011* (2013.01); *G02B 2027/014* (2013.01); *G02B 2027/0138* (2013.01); *G02B 2027/0154* (2013.01)

(58) Field of Classification Search
CPC ............ G02B 27/1076; G02B 27/0172; G02B 2072/014; G02B 2027/0154; G02B 2027/0161; G02B 27/0176; G02B 27/0179
See application file for complete search history.

(56) References Cited

U.S. PATENT DOCUMENTS 4,944,361 A 7/1990 Lindgren et al.
5,046,192 A 9/1991 Ryder
(Continued)

OTHER PUBLICATIONS

International Search Report and Written Opinion dated Apr. 13, 2018 in International Patent Application No. PCT/US2017/064904, 13 pages.
(Continued)

*Primary Examiner* — Ariel A Balaoing
(74) *Attorney, Agent, or Firm* — Shook, Hardy & Bacon L.L.P.

(57) ABSTRACT

A head-mounted display that is modular and configured for securement to an item of headwear is provided. The head-mounted display may comprise a selection of components that are desired for a particular application, such as a display boom, camera, microphone, position-tracking component, etc., and may include an attachment mechanism for securing the selection of components to the item of headwear. The head-mounted display may include a display module having a corresponding display characteristic that provides a visual display and/or display functionality that is appropriate for a particular application. The display module may include a micro display that is non-transparent and/or a waveguide optic that is at least partially transparent, and may be configured to provide an augmented reality display for a user.

20 Claims, 22 Drawing Sheets

(51) Int. Cl.
*A42B 3/04* (2006.01)
*G06F 3/01* (2006.01)

(56) References Cited

U.S. PATENT DOCUMENTS

| | | |
|---|---|---|
| 5,185,807 A | 2/1993 | Bergin et al. |
| 5,767,820 A | 6/1998 | Bassett et al. |
| 5,796,374 A * | 8/1998 | Cone ................ G02B 27/0176 345/8 |
| 5,806,079 A | 9/1998 | Rivette et al. |
| 5,815,126 A | 9/1998 | Fan et al. |
| 5,850,211 A | 12/1998 | Tognazzini |
| 5,882,137 A | 3/1999 | Epp et al. |
| 5,977,935 A | 11/1999 | Yasukawa et al. |
| 6,061,064 A | 5/2000 | Reichlen |
| 6,198,462 B1 | 3/2001 | Daily et al. |
| 6,222,677 B1 * | 4/2001 | Budd ................ G02B 27/0172 359/630 |
| 6,352,228 B1 | 3/2002 | Buerklin |
| 6,434,250 B1 | 8/2002 | Tsuhako |
| 6,456,262 B1 | 9/2002 | Bell |
| 6,587,700 B1 * | 7/2003 | Meins ................ H04M 1/0214 455/575.3 |
| 6,637,883 B1 | 10/2003 | Tengshe et al. |
| 6,708,339 B1 | 3/2004 | Smith |
| 6,747,611 B1 * | 6/2004 | Budd ................ G02B 27/0172 345/7 |
| 6,867,752 B1 | 3/2005 | Yamazaki et al. |
| 7,103,841 B2 | 9/2006 | Ronkainen et al. |
| 7,113,170 B2 | 9/2006 | Lauper et al. |
| 7,124,425 B1 | 10/2006 | Anderson, Jr. et al. |
| 7,245,737 B2 | 7/2007 | Amae et al. |
| 7,453,451 B1 | 11/2008 | Maguire, Jr. |
| 7,853,050 B2 | 12/2010 | Wang et al. |
| 7,928,926 B2 | 4/2011 | Yamamoto et al. |
| 8,378,924 B2 | 2/2013 | Jacobsen et al. |
| 8,531,355 B2 | 9/2013 | Maltz |
| 8,643,951 B1 | 2/2014 | Wheeler et al. |
| 8,706,685 B1 | 4/2014 | Smith et al. |
| 8,743,021 B1 | 6/2014 | Park et al. |
| 8,751,969 B2 | 6/2014 | Matsuda et al. |
| 8,855,719 B2 | 10/2014 | Jacobsen et al. |
| 8,922,481 B1 | 12/2014 | Kauffmann et al. |
| 8,929,589 B2 | 1/2015 | Publicover et al. |
| 8,990,682 B1 | 3/2015 | Wong et al. |
| 9,075,249 B2 | 7/2015 | Heinrich et al. |
| 9,122,307 B2 | 9/2015 | Jacobsen et al. |
| 9,134,793 B2 | 9/2015 | McDonald et al. |
| 9,164,588 B1 | 10/2015 | Johnson et al. |
| 9,240,069 B1 | 1/2016 | Li |
| 9,294,607 B2 | 3/2016 | Jacobsen et al. |
| 9,301,085 B2 | 3/2016 | Parkinson et al. |
| 9,377,852 B1 | 6/2016 | Shapiro et al. |
| 9,377,862 B2 | 6/2016 | Parkinson et al. |
| 9,442,631 B1 | 9/2016 | Patel et al. |
| 9,477,888 B1 | 10/2016 | Lewis |
| 9,500,867 B2 | 11/2016 | Hennelly et al. |
| 9,588,593 B2 | 3/2017 | Li |
| 9,615,067 B1 * | 4/2017 | Foote ................ H04N 7/185 |
| 9,658,451 B2 | 5/2017 | Kobayashi |
| 9,817,232 B2 | 11/2017 | Lindley et al. |
| 9,823,742 B2 | 11/2017 | Parker et al. |
| 9,904,369 B2 | 2/2018 | Lai et al. |
| 9,913,302 B2 | 3/2018 | Parkinson et al. |
| 9,916,006 B2 | 3/2018 | Maltz |
| 9,940,754 B2 | 4/2018 | Kuribara |
| 9,946,079 B2 | 4/2018 | Ozeki |
| 10,013,053 B2 | 7/2018 | Cederlund et al. |
| 10,013,976 B2 | 7/2018 | Woodall et al. |
| 10,048,750 B2 | 8/2018 | Du et al. |
| 10,078,416 B2 | 9/2018 | Tsuda |
| 2002/0037770 A1 | 3/2002 | Paul et al. |
| 2002/0044152 A1 | 4/2002 | Abbott, III et al. |
| 2002/0190947 A1 | 12/2002 | Feinstein |
| 2003/0020707 A1 | 1/2003 | Kangas et al. |
| 2003/0182713 A1 | 10/2003 | Rolla |
| 2004/0008158 A1 * | 1/2004 | Chi ................ G02B 27/0176 345/8 |
| 2004/0218776 A1 | 11/2004 | Rolla |
| 2005/0083248 A1 * | 4/2005 | Biocca ................ A41D 31/0088 345/8 |
| 2006/0044265 A1 | 3/2006 | Min |
| 2006/0048286 A1 * | 3/2006 | Donato ................ A42B 3/042 2/422 |
| 2007/0024507 A1 | 2/2007 | Kasamatsu et al. |
| 2007/0052672 A1 | 3/2007 | Ritter et al. |
| 2007/0130547 A1 | 6/2007 | Boillot |
| 2007/0171193 A1 * | 7/2007 | Nakamura ................ B60K 35/00 345/156 |
| 2007/0183616 A1 | 8/2007 | Wahl et al. |
| 2007/0211023 A1 | 9/2007 | Boillot |
| 2007/0220108 A1 | 9/2007 | Whitaker |
| 2009/0099836 A1 * | 4/2009 | Jacobsen ................ G06F 17/289 704/3 |
| 2009/0100732 A1 * | 4/2009 | Seidler ................ A47F 7/147 40/729 |
| 2009/0128448 A1 | 5/2009 | Riechel |
| 2009/0154990 A1 | 6/2009 | Julliere |
| 2009/0195652 A1 | 8/2009 | Gal |
| 2010/0194350 A1 * | 8/2010 | Chatterjee ................ G06F 3/03543 320/137 |
| 2010/0259471 A1 | 10/2010 | Takano et al. |
| 2010/0315329 A1 | 12/2010 | Previc et al. |
| 2010/0328204 A1 | 12/2010 | Edwards et al. |
| 2011/0001699 A1 | 1/2011 | Jacobsen et al. |
| 2011/0090135 A1 | 4/2011 | Tricoukes et al. |
| 2011/0187640 A1 * | 8/2011 | Jacobsen ................ G02B 27/017 345/156 |
| 2011/0249122 A1 * | 10/2011 | Tricoukes ................ G02B 27/017 348/158 |
| 2012/0050143 A1 | 3/2012 | Border et al. |
| 2012/0062444 A1 | 3/2012 | Cok et al. |
| 2012/0068914 A1 | 3/2012 | Jacobsen et al. |
| 2012/0086624 A1 * | 4/2012 | Thompson ................ G02B 27/017 345/8 |
| 2012/0192065 A1 | 7/2012 | Migos et al. |
| 2012/0235896 A1 | 9/2012 | Jacobsen et al. |
| 2012/0235902 A1 | 9/2012 | Eisenhardt et al. |
| 2012/0236025 A1 | 9/2012 | Jacobsen et al. |
| 2012/0272179 A1 | 10/2012 | Stafford |
| 2012/0272484 A1 | 11/2012 | Willborn |
| 2012/0287284 A1 * | 11/2012 | Jacobsen ................ G06F 1/163 348/158 |
| 2013/0007672 A1 | 1/2013 | Taubman |
| 2013/0007686 A1 | 1/2013 | Lu |
| 2013/0021269 A1 | 1/2013 | Johnson et al. |
| 2013/0047322 A1 | 2/2013 | Peebles |
| 2013/0054576 A1 | 2/2013 | Karmarkar et al. |
| 2013/0069985 A1 | 3/2013 | Wong et al. |
| 2013/0089214 A1 | 4/2013 | Tricoukes et al. |
| 2013/0135353 A1 | 5/2013 | Wheeler et al. |
| 2013/0169514 A1 | 7/2013 | Edwards et al. |
| 2013/0187835 A1 | 7/2013 | Vaught et al. |
| 2013/0231937 A1 | 9/2013 | Woodall et al. |
| 2013/0239000 A1 | 9/2013 | Parkinson et al. |
| 2013/0241805 A1 | 9/2013 | Gomez |
| 2013/0246967 A1 | 9/2013 | Wheeler et al. |
| 2013/0285886 A1 | 10/2013 | Pombo et al. |
| 2013/0321255 A1 | 12/2013 | Lamb et al. |
| 2013/0326208 A1 | 12/2013 | Jacobsen et al. |
| 2014/0000015 A1 | 1/2014 | Arai |
| 2014/0002357 A1 | 1/2014 | Pomba et al. |
| 2014/0028923 A1 * | 1/2014 | Griffin ................ H04N 5/64 348/839 |
| 2014/0043214 A1 * | 2/2014 | Park ................ G06F 1/163 345/8 |
| 2014/0098132 A1 | 4/2014 | Fein et al. |
| 2014/0111427 A1 | 4/2014 | Lindley et al. |
| 2014/0153173 A1 | 6/2014 | Pomba et al. |
| 2014/0195247 A1 | 7/2014 | Parkinson et al. |
| 2014/0253605 A1 * | 9/2014 | Border ................ G02B 27/0172 345/690 |
| 2014/0267419 A1 | 9/2014 | Ballard et al. |

(56) References Cited

U.S. PATENT DOCUMENTS

| | | | |
|---|---|---|---|
| 2014/0268054 A1 | 9/2014 | Olsson et al. | |
| 2014/0282278 A1 | 9/2014 | Anderson et al. | |
| 2014/0380230 A1 | 12/2014 | Venable et al. | |
| 2015/0009132 A1 | 1/2015 | Kuriya et al. | |
| 2015/0102984 A1* | 4/2015 | Wong | G02B 27/017 345/8 |
| 2015/0142440 A1 | 5/2015 | Parkinson et al. | |
| 2015/0153571 A1 | 6/2015 | Ballard et al. | |
| 2015/0206321 A1 | 7/2015 | Scavezze et al. | |
| 2015/0213778 A1 | 7/2015 | Moravetz | |
| 2015/0220142 A1 | 8/2015 | Parkinson et al. | |
| 2015/0288666 A1 | 10/2015 | Rao et al. | |
| 2015/0309316 A1 | 10/2015 | Osterhout et al. | |
| 2016/0026253 A1 | 1/2016 | Bradski et al. | |
| 2016/0077337 A1 | 3/2016 | Raffle et al. | |
| 2016/0093105 A1 | 3/2016 | Rimon et al. | |
| 2016/0162020 A1 | 6/2016 | Lehman et al. | |
| 2016/0178912 A1 | 6/2016 | Kusuda et al. | |
| 2016/0259862 A1 | 9/2016 | Navanageri et al. | |
| 2016/0324248 A1 | 11/2016 | Winters et al. | |
| 2016/0329634 A1 | 11/2016 | Osterhout et al. | |
| 2016/0342782 A1 | 11/2016 | Mullins et al. | |
| 2016/0370855 A1* | 12/2016 | Lanier | H04N 5/335 |
| 2017/0017464 A1 | 1/2017 | Roy | |
| 2017/0060230 A1 | 3/2017 | Faaborg et al. | |
| 2017/0092002 A1 | 3/2017 | Mullins et al. | |
| 2017/0115728 A1 | 4/2017 | Park et al. | |
| 2017/0160812 A1 | 6/2017 | Park et al. | |
| 2017/0168305 A1 | 6/2017 | Kusuda et al. | |
| 2017/0337897 A1 | 11/2017 | Jung et al. | |
| 2017/0351393 A1 | 12/2017 | Ott et al. | |
| 2017/0351778 A1 | 12/2017 | Sperling | |
| 2018/0011326 A1 | 1/2018 | Ishizaki | |
| 2018/0143756 A1 | 5/2018 | Mildrew et al. | |
| 2018/0276896 A1 | 9/2018 | Launonen | |
| 2018/0356884 A1 | 12/2018 | Lee | |

OTHER PUBLICATIONS

International Search Report and Written Opinion dated Apr. 20, 2018 in International Patent Application No. PCT/US2017/064904, 12 pages.

The RealWear HMI-1 can be used with both hard hat and safety glasses #safetyfirst #msasafety #iiot #wearables @realheadwear inc (Realwear Inc) Sep. 15, 2016 (Sep. 15, 2016), available at: <www.facebook.com/RealWearInc/>, entire document.

"Andy Lowery on the Industrial Internet" (Techonomy Media) Nov. 30, 2016 (Nov. 30, 2016), available at: <https://www.youtube.com/watch?v=OCIQM5aV5o4&feature=youtu.be>, entire document,especially at (2:10).

International Search Report and Written Opinion dated Jan. 19, 2018 in International Patent Application No. PCT/US2017/064898, 12 pages.

International Search Report and Written Opinion dated Feb. 16, 2018 in International Patent Application No. PCT/US2017/066656, 15 pages.

International Search Report and Written Opinion dated Feb. 23, 2018 in International Patent Application No. PCT/US2017/064905, 9 pages.

International Search Report and Written Opinion dated Mar. 5, 2018 in International Patent Application No. PCT/US2017/068123, 9 pages.

Non-Final Office Action dated Aug. 9, 2018 in U.S. Appl. No. 15/390,375, 8 pages.

Non-Final Office Action dated Sep. 26, 2018 in U.S. Appl. No. 15/390,380, 14 pages.

First Action Interview Pre-Interview Communication dated Nov. 16, 2018 in U.S. Appl. No. 15/697,214, 7 pages.

First Action Interview Pre-Interview Communication dated Nov. 21, 2018 in U.S. Appl. No. 15/390,389, 8 pages.

Final Office Action dated Feb. 1, 2019 in U.S. Appl. No. 15/390,375, 8 pages.

First Action Interview Office Action dated Feb. 7, 2019 in U.S. Appl. No. 15/697,214, 29 pages.

First Action Interview Pre-Interview Communication dated Feb. 19, 2019 in U.S. Appl. No. 15/390,191, 11 pages.

Notice of Allowance dated Mar. 21, 2019 in U.S. Appl. No. 15/390,380, 7 pages.

First Action Interview Office Action dated Apr. 12, 2019 in U.S. Appl. No. 15/390,191, 7 pages.

Notice of Allowance dated Apr. 24, 2019 in U.S. Appl. No. 15/390,375, 7 pages.

Final Office Action dated May 2, 2019 in U.S. Appl. No. 15/390,389, 27 pages.

* cited by examiner

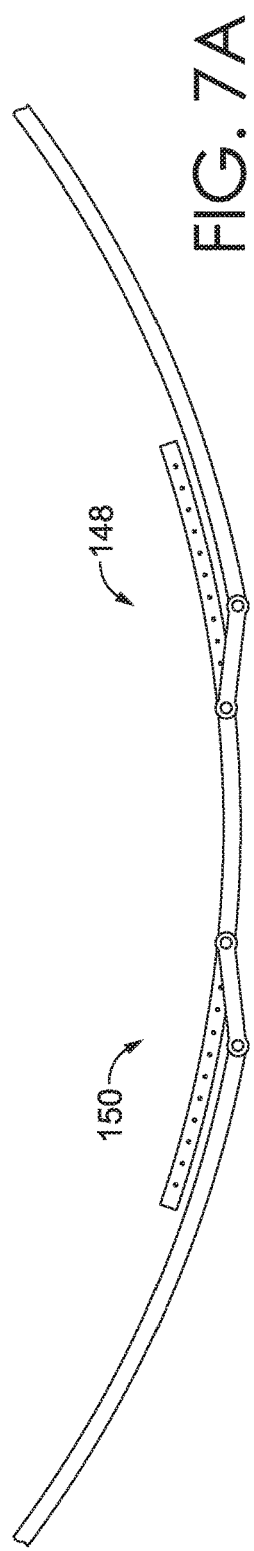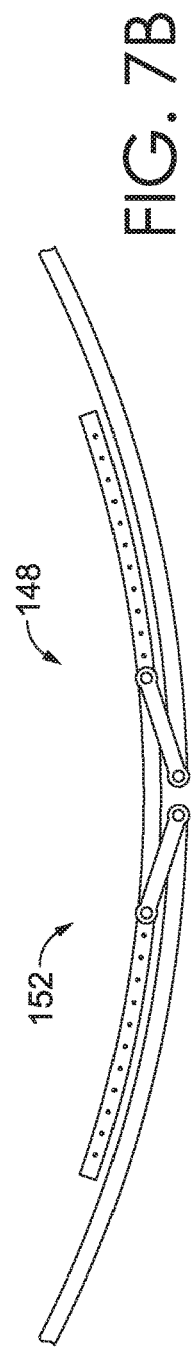

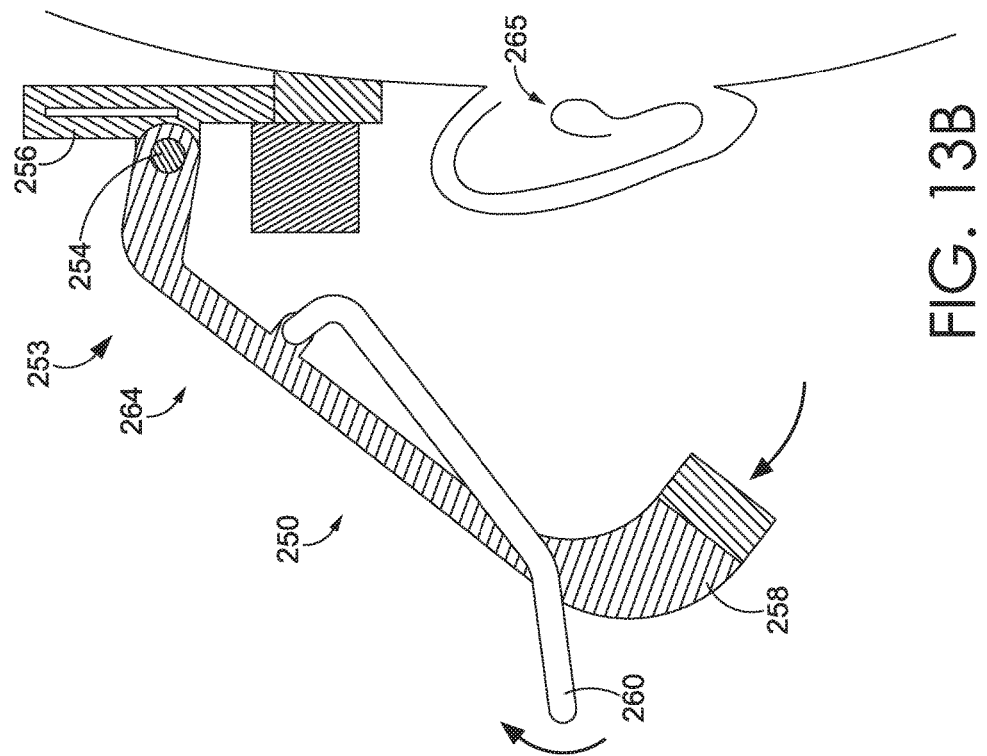
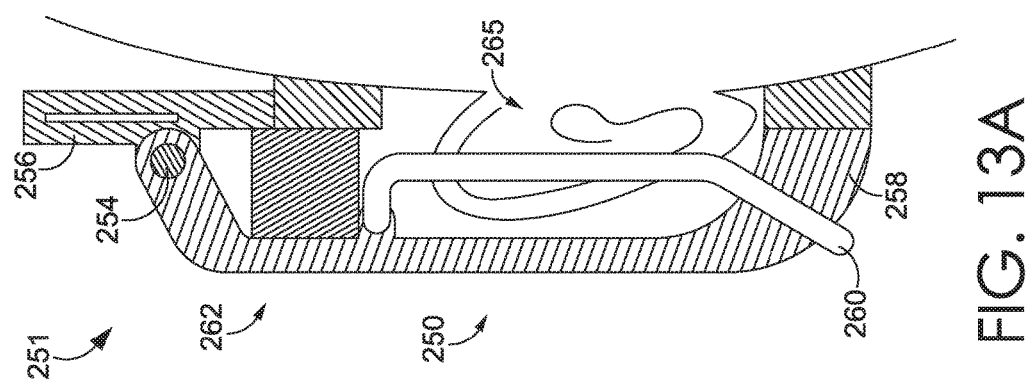
FIG. 13B
FIG. 13A

INTERCHANGEABLE OPTICS FOR A HEAD-MOUNTED DISPLAY

CROSS-REFERENCE TO RELATED APPLICATIONS

This application is related by subject matter to the following U.S. Patent Applications filed on the same date: U.S. patent application Ser. No. 15/390,389, entitled "CONTEXT BASED CONTENT NAVIGATION FOR A WEARABLE DISPLAY"; U.S. patent application Ser. No. 15/390,380, entitled "MODULAR COMPONENTS FOR A HEAD-MOUNTED DISPLAY;" U.S. patent application Ser. No. 15/390,191, entitled "HANDS-FREE NAVIGATION OF TOUCH-BASED OPERATING SYSTEMS;" and U.S. patent application Ser. No. 15/390,375, entitled "ARTICULATING COMPONENTS FOR A HEAD-MOUNTED DISPLAY." Each of these applications is incorporated herein by reference in its entirety.

TECHNICAL FIELD

The field relates to head-mounted displays.

BACKGROUND

Head-mounted displays are sometimes used to allow a user to mount technology on or around their head, allowing the user to transport and use different technologies with greater ease and flexibility. Head-mounted displays also allow a user to have interaction with the technology while otherwise remaining engaged in other tasks. However, in certain circumstances, a head-mounted display with greater flexibility, modularity, and mountability, among other aspects, is needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In brief, and at a high level, this disclosure describes, among other things, a head-mounted display having a modular design that allows a number of different components to be used in an interchangeable fashion, and additionally, describes an attachment mechanism for securing the head-mounted display to an item of headwear appropriate for a particular application, such as one requiring head, eye, and/or ear protection. Exemplary components used with a head-mounted display may include a computer processor, a display boom, a camera, and/or a display module, for example. The display module may be releasably attachable to the head-mounted display, and may be configured to provide a selected display characteristic. Different display modules may be used to provide different display characteristics and functionality, and as such, a head-mounted display that may be used in a variety of different applications is provided.

In one embodiment of the present technology, a head-mounted display is provided. The head-mounted display comprises a base, a display boom having a first end and a second end, the display boom movably coupled to the base at the second end, a display module coupled to the first end of the display boom, one or more computer processors communicatively coupled to the display module, a power source, and an attachment mechanism for releasably securing the display module, the display boom, the one or more computer processors, and the power source to an item of headwear. The attachment mechanism comprises one or more rigid coupling elements and one or more securing straps coupled to the one or more rigid coupling elements for securing about the item of headwear.

In another embodiment of the present technology, a head-mounted display is provided. The head-mounted display comprises a display boom comprising a first end and a second end, a display module coupled to the display boom between the first end and the second end, one or more computer processors communicatively coupled to the display module, a power source connected to the one or more computer processors and to the display module, and an attachment mechanism for releasably securing the display module, the display boom, the one or more computer processors, and the power source to an item of headwear. The attachment mechanism comprises one or more rigid coupling elements and one or more securing straps coupled to the one or more rigid coupling elements for securing about the item of headwear. The one or more rigid coupling elements comprise at least a first rigid coupling element having a first rotatable coupling secured to the first end of the display boom and a second rigid coupling element having a second rotatable coupling secured to the second end of the display boom.

In another embodiment of the present technology, a head-mounted display is provided. The head-mounted display comprises a display boom comprising a first end and a second end, a display module coupled to the display boom at the first end, and a sound-dampening ear-cover assembly coupled to the display boom at the second end, the sound-dampening ear-cover assembly comprising a first portion and a second portion that are movably coupled to each other, the sound-dampening ear-cover assembly adjustable between a first configuration and a second configuration. In the first configuration, the first portion and the second portion are in a first position relative to each other. In the second configuration, the first portion and the second portion are in a second position relative to each other. The head-mounted display further comprises one or more computer processors communicatively coupled to the display module and a power source connected to the one or more computer processors and to the display module.

In another embodiment of the present technology, a head-mounted display having interchangeable components is provided. The head-mounted display comprises a first display module having a first corresponding display characteristic, a display boom comprising a first end and a second end, the display boom movably coupled to a base located at the second end, one or more computer processors communicatively coupled to the first display module, a power source connected to the one or more computer processors, and a releasable coupling. The releasable coupling comprises a first mateable coupling and a second mateable coupling, the first mateable coupling located at the first end of the display boom, and the second mateable coupling located on the first display module. The first and second mateable couplings are releasably securable to each other.

In another embodiment of the present technology, a head-mounted display having interchangeable components is provided. The head-mounted display comprises a first display module having a first corresponding display characteristic, the first display module configured to provide multiple viewing states, a display boom comprising a first end and a second end, the display boom movably coupled to a base located at the second end, one or more computer processors communicatively coupled to the first display module, a power source connected to the one or more computer processors, and a releasable coupling. The releasable coupling comprises a first mateable coupling and a second mateable coupling, the first mateable coupling located at the first end of the display boom and the second mateable coupling located on the first display module. The first and second mateable couplings are releasably securable to each other.

In another embodiment of the present technology, a method of adjusting a head-mounted display is provided. The method comprises providing a head-mounted display comprising a display boom having a first end and a second end, the display boom movably coupled to a base located at the second end, one or more computer processors, a power source, a first display module configured to provide multiple viewing states, and a releasable coupling comprising a first mateable coupling and a second mateable coupling, the first mateable coupling located at the first end of the display boom and the second mateable coupling located on the first display module. The method further comprises releasably securing the first display module to the display boom by securing the first mateable coupling to the second mateable coupling.

As used in this disclosure, the term "display module" includes any component used with a head-mounted display that is configured to provide a display characteristic that is viewable to a user. A "display characteristic" includes any viewable characteristic, such as a display state (e.g., transparent, partially transparent, non-transparent, selectively transparent, interactive, text/image/video presenting, etc.), a display type (e.g., an optic, waveguide optic, digital display, micro display (e.g., a liquid crystal display (LCD), light-emitting diode (LED) display, organic light-emitting diode (OLED) display, digital light processing (DLP) display, etc.), or any combination thereof, etc.), a display configuration (e.g., one or multiple display portions of the same or different type, display portions at different angles, display portions in different arrangements, etc.), and/or technical specifications of the display portion (e.g., resolution, pixels per inch, size, parallax, contrast, color depth, refresh rate, etc.), in addition to other display characteristics. The preceding examples are intended to be exemplary and non-limiting.

As used in this disclosure, the term "attachment mechanism" includes any one or a combination of components, separate or interconnected, configured to releasably secure, attach, affix, join, mount, and/or suspend from an item of headwear, and/or a user's head, various components of a head-mounted display, such as those discussed herein. An attachment mechanism may include one or more of straps, clips, spring-based elements, screw-based elements, male-female connectors, elastically deformable elements, buttons, hooks, hook-and-loop fasteners, tensioning mechanisms (e.g., biasing elements, etc.), adhesives, and/or suspending elements (e.g., hangers, hooks, straps, harnesses, etc.). The preceding examples are intended to be exemplary and non-limiting.

BRIEF DESCRIPTION OF THE DRAWINGS

The present technology is described in detail herein with reference to the attached figures, which are exemplary and non-limiting in nature, wherein:

FIGS. 7A-7B depict an exemplary strap-based tensioning mechanism for a head-mounted display, in accordance with an embodiment of the present technology;

FIGS. 13A-13B depict a partial, cross-section view of the sound-dampening ear-cover assembly shown in FIGS. 12A-12B, in accordance with an embodiment of the present technology;

DETAILED DESCRIPTION

The subject matter of the present technology is described with specificity in this disclosure to meet statutory requirements. However, this description is not intended to limit the scope hereof. Rather, the claimed subject matter may be embodied in other ways, to include different steps, combinations of steps, features, and/or combinations of features, similar to the ones described in this disclosure, in conjunction with other present or future technologies. Moreover, although the terms "step" and "block" may be used to identify different elements of methods employed, the terms should not be interpreted as implying any particular order among or between various steps or blocks unless and except when the order of individual steps or blocks is explicitly described and required.

At a high level, the present technology relates generally to head-mounted displays, as well as components, configurations, and uses thereof. An exemplary head-mounted display may include a selection of components in a modular configuration, and also, may include an attachment mechanism for securing the selection of components to an item of headwear (e.g., a helmet), allowing the head-mounted display to be used in a variety of different applications. Additionally, a display module for the head-mounted display may be interchangeable and selected based on a desired corresponding display characteristic.

Figure 1:
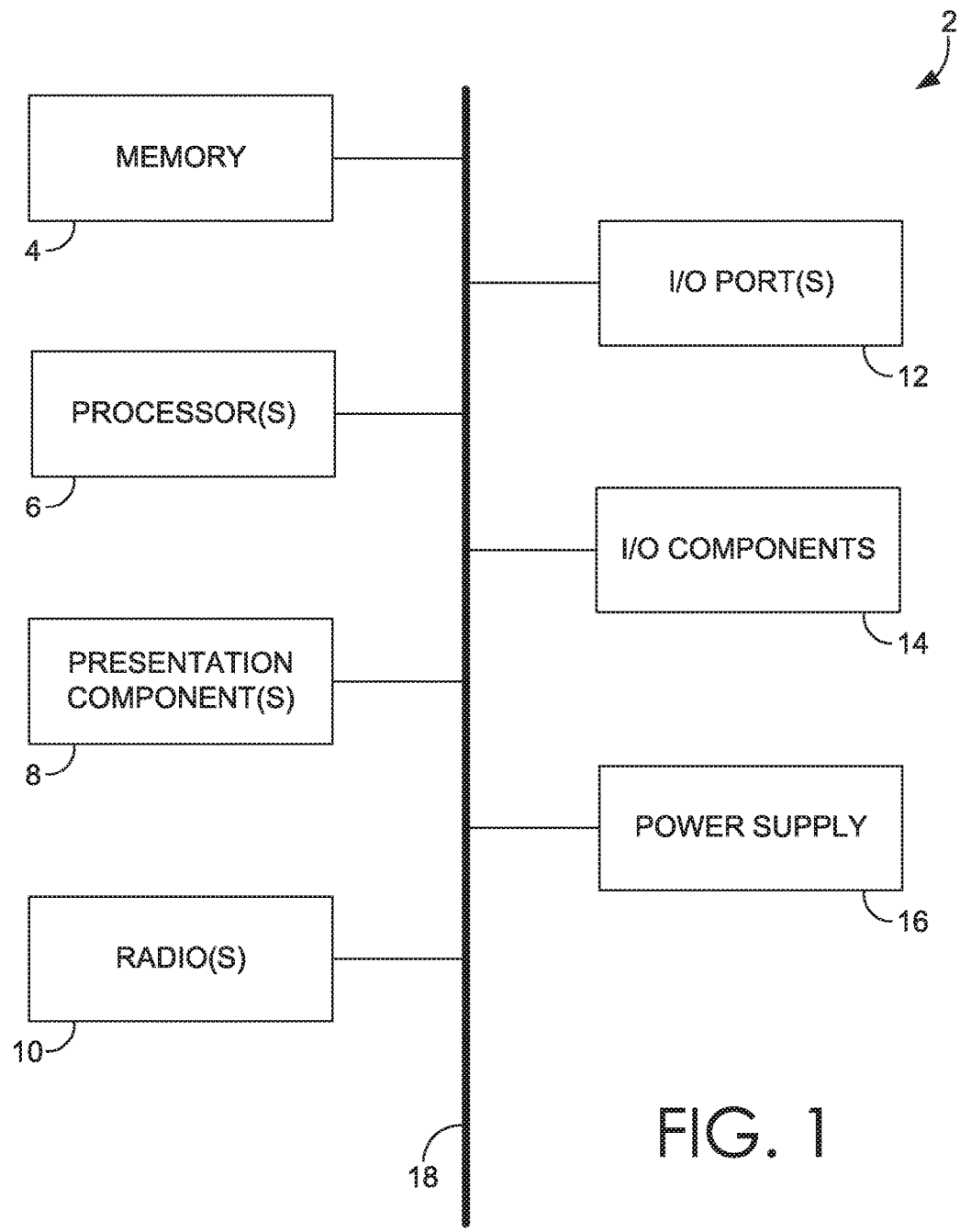
FIG. 1 is an exemplary computing environment for use with a head-mounted display, in accordance with an embodiment of the present technology.

Turning initially to FIG. 1, a block diagram of an exemplary computing device 2 suitable for use with embodiments of the present technology is provided. Computing device 2 includes a bus 18 that may directly or indirectly couple various components together, including memory 4, processor(s) 6, presentation component(s) 8, radio(s) 10, input/output (I/O) port(s) 12, input/output (I/O) component(s) 14, and power supply 16. It should be noted that although some components depicted in FIG. 1 are shown in the singular, they may be plural. For example, computing device 2 might include multiple processors and/or multiple radios. It should also be noted that additional or alternative components may be provided with computing device 2, and the configuration shown in FIG. 1 is merely exemplary.

Memory 4 may take the form of the memory components described herein. Thus, further elaboration will not be provided, but it should be noted that memory 4 may include any type of tangible medium that is capable of storing information, such as a database. A database may include any collection of records, data, and/or other information. In one embodiment, memory 4 may include a set of embodied computer-executable instructions that, when executed, facilitate various functions or steps disclosed herein. These embodied instructions will be referred to as "instructions" or an "application" for short.

Processor 6 may actually be multiple processors that receive instructions and process them accordingly. Presentation component 8 may include a display, a speaker, and/or other components that can present information through visual, auditory, and/or other tactile cues (e.g., a display, a screen, a lamp, a light-emitting diode (LED), a graphical user interface (GUI), or even a lighted keyboard).

Radio 10 may facilitate communication with a network, and may additionally or alternatively facilitate other types of wireless communications, such as Wi-Fi, WiMAX, LTE, Bluetooth, and/or other VoIP communications. The radio 10 may be configured to support multiple technologies, and/or multiple radios may be configured and utilized to support multiple technologies.

Input/output (I/O) ports 12 may take a variety of forms. Exemplary I/O ports may include a USB jack, a stereo jack, an infrared port, a firewire port, and/or other proprietary communications ports. Input/output (I/O) components 14 may comprise one or more keyboards, microphones, speakers, touchscreens, and/or any other item usable to directly or indirectly input/output data to or from the computing device 2.

Power supply 16 may include batteries, fuel cells, and/or any other component that may act as a power source to supply power to computing device 2 or to other components, including through one or more electrical connections or couplings. Power supply 16 may be configured to selectively supply power to different components independently and/or concurrently.

Figure 2A:
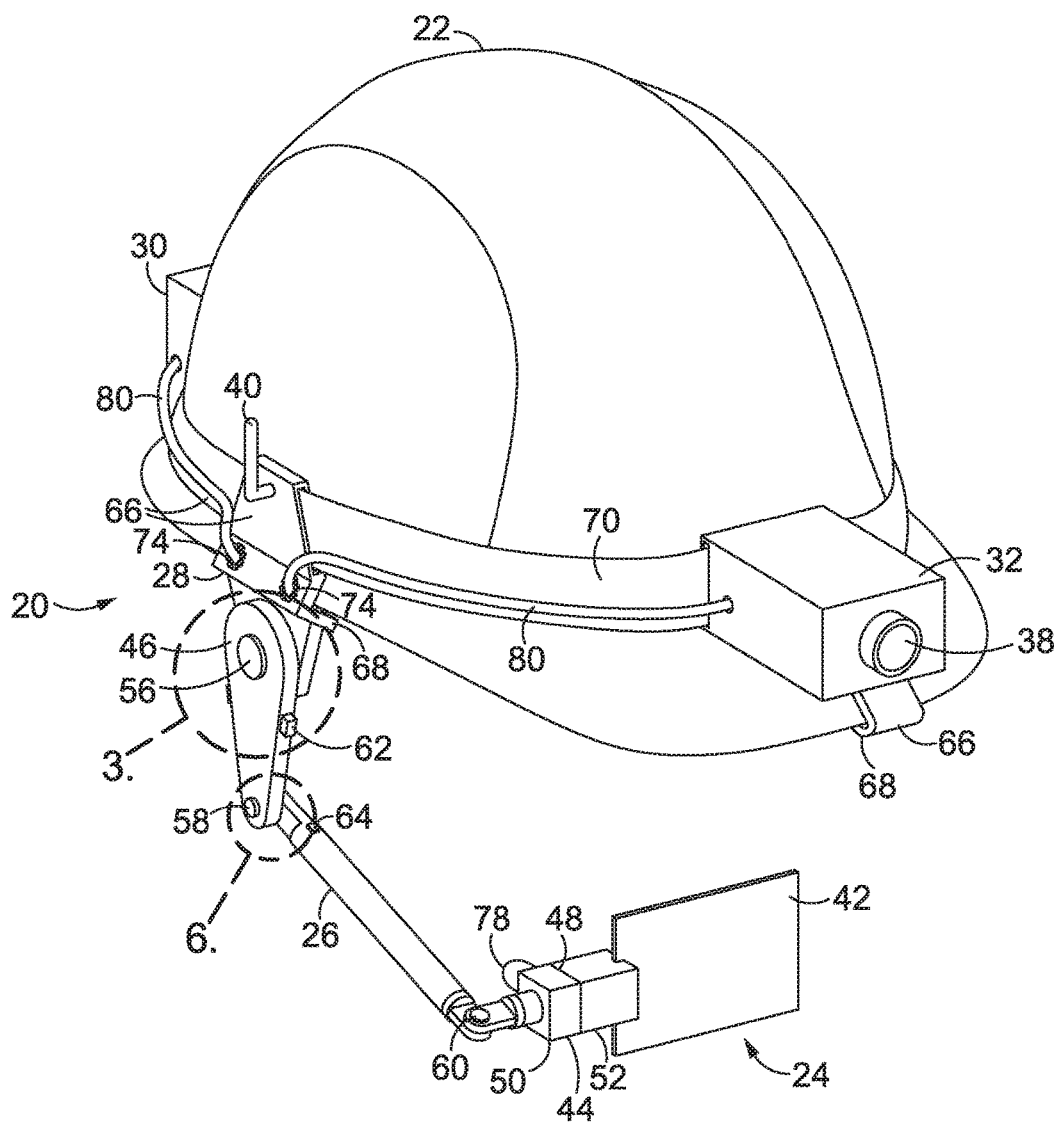
FIG. 2A is an exemplary head-mounted display mounted on an item of headwear, in accordance with an embodiment of the present technology.
Figure 2B:
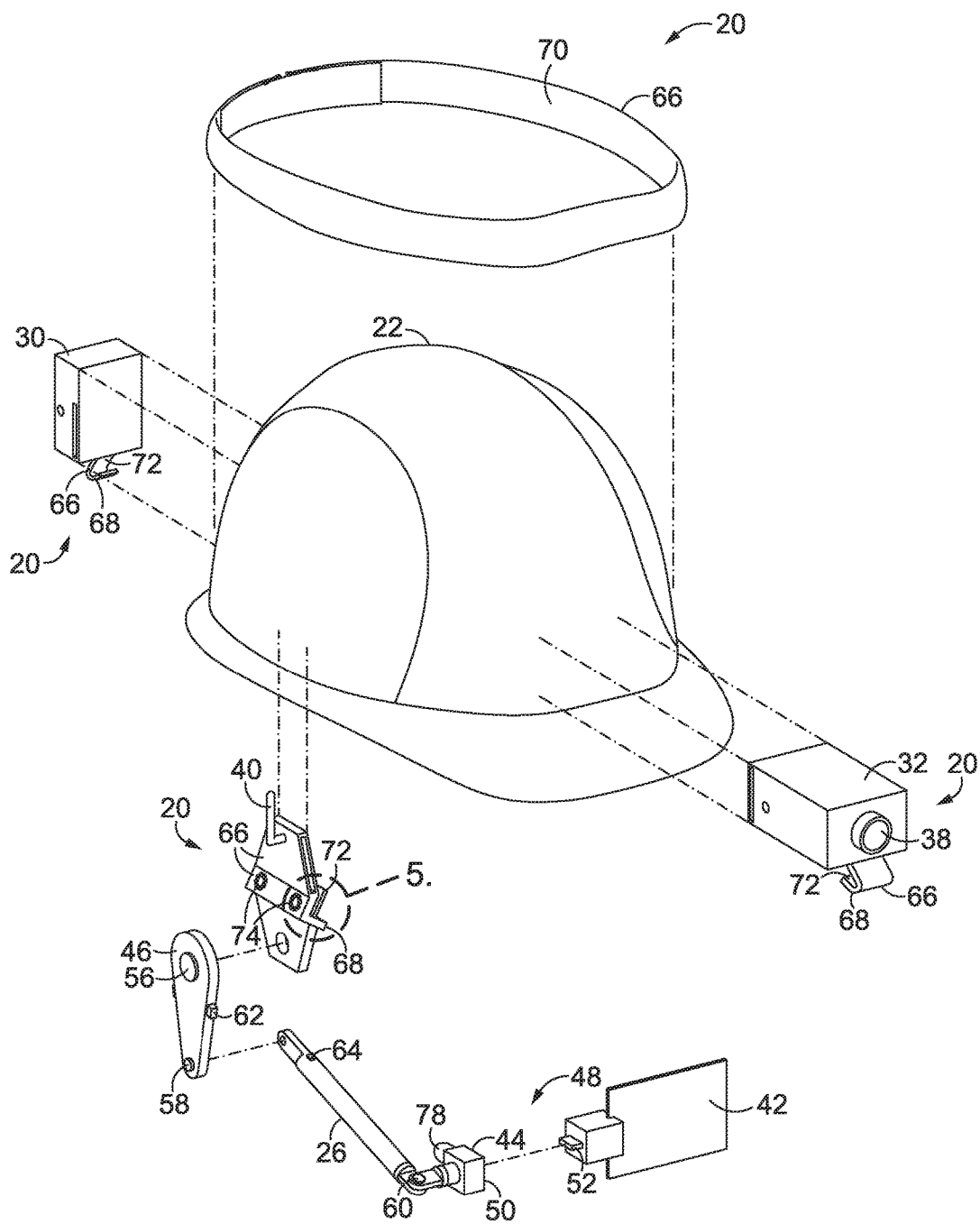
FIG. 2B is an exploded version of the head-mounted display depicted in FIG. 2A, in accordance with an embodiment of the present technology.

Referring to FIGS. 2A-2B, an exemplary head-mounted display 20 is provided, in accordance with an embodiment of the present technology. The head-mounted display 20 includes a display module 24, a display boom 26, a base 28 coupled to the display boom 26, a power source 30, a communication component 40, and an electronics module 32 mounted on an item of headwear 22. In FIGS. 2A-2B, the headwear 22 is a helmet, although the head-mounted display 20 may be configured for securement to other types of headwear as well.

The head-mounted display 20 further includes a camera 38 attached to the electronics module 32. The electronics module 32 provides a consolidation of one or more components of the head-mounted display 20 (e.g., computer processor(s), memory, position-tracking component(s), communication component(s), etc.). However, it should be noted that the components associated with the electronics module 32 may also be distributed at other locations about the head-mounted display 20 and communicatively connected to each other as necessary, rather than consolidated as shown in FIGS. 2A-2B.

The display boom 26 includes a first end 44 coupled to the display module 24 and a second end 46 coupled to the base 28. The display module 24 includes at least one display portion 42 and provides a corresponding display characteristic. In one embodiment, the display portion 42 may include a waveguide optic that is at least partially transparent for providing an augmented reality display on which text, images, and/or other objects may be shown interactively with a real-time viewed-environment.

Figure 15A:
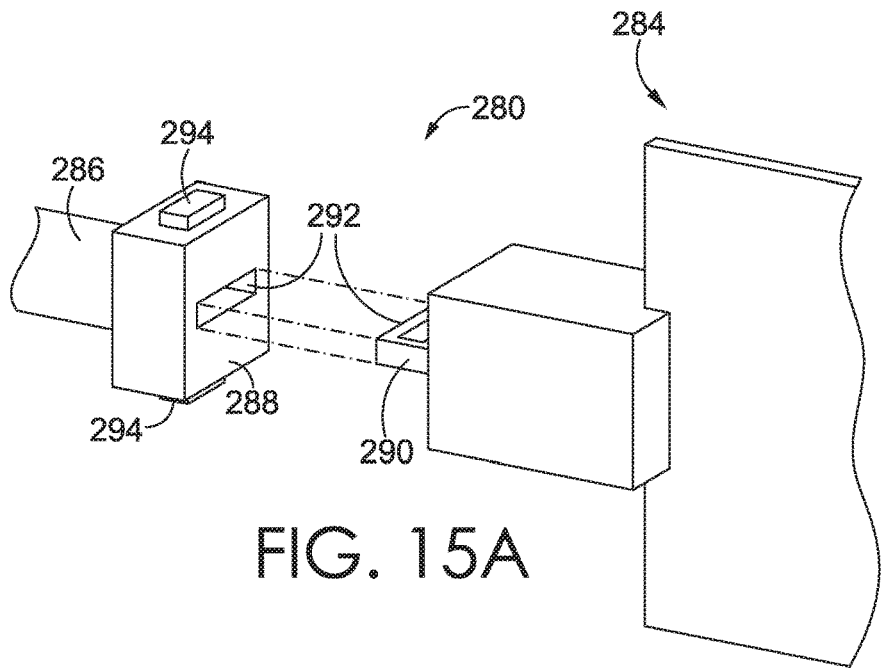
FIGS. 15A-15B depict exemplary releasable couplings for a display module, in accordance with embodiments of the present technology.
Figure 15B:
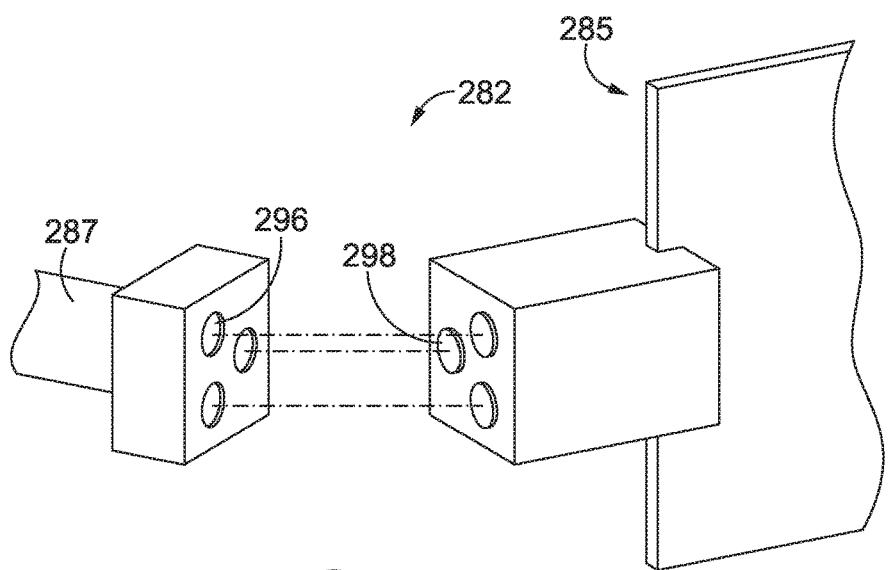

The display module 24 and the display boom 26 are secured to each other with a releasable coupling 48 (non-limiting examples of which are depicted in FIGS. 15A-15B). The releasable coupling 48 includes a first mateable coupling 50 attached to the first end 44 of the display boom 26 and a second mateable coupling 52 attached to the display module 24. The display module 24 may be interchangeable with other display modules each having a separate mateable coupling that is also releasably securable to the first mateable coupling 50 (e.g., by having a similar configuration as the second mateable coupling 52). The other display modules may also provide different corresponding display characteristics than the display module 24.

The second end 46 of the display boom 26 is movably coupled to the base 28 with a movable coupling 56. The display boom 26 also includes first and second movable joints 58, 60 which, in combination, provide articulation of the display module 24 relative to the base 28. The display boom 26 further includes first and second releasable couplings 62, 64 that allow portions of the display boom 26 to be detached, such as to allow modular configuration. It should be noted that the first and second movable joints 58, 60 and the first and second releasable couplings 62, 64 depicted in FIGS. 2A-2B may or may not be used, depending on the desired functionality and configuration of the head-mounted display 20.

The head-mounted display 20 further includes an attachment mechanism 66 configured to attach the components of the head-mounted display 20 (e.g., the electronics module 32, the display boom 26, the power source 30, etc.) to the headwear 22. The attachment mechanism 66 includes rigid coupling elements 68 and a strap 70 which may be used together to secure the various components of the head-mounted display 20 to the headwear 22. As shown in FIG. 2B, each of the rigid coupling elements 68 may include a concave (i.e., recessed) channel 72 for engaging an edge of the headwear 22, and additionally, a tensioning mechanism 74 may be used with one or more of the rigid coupling elements 68 for securing a corresponding rigid coupling element 68 against the headwear 22. The head-mounted display 20 shown in FIGS. 2A-2B also includes a microphone 78 attached to the display module 24. The microphone 78 may alternatively be positioned on the display boom 26, and may be configured to receive audio input from a user and communicate with one or more computer processors and/or communication components of the head-mounted display 20.

Any of the components of the head-mounted display 20 may be communicatively interconnected with each other. To this effect, communication between components may be provided using a wireless connection (e.g., Bluetooth) and/or a wired-connection, such as the wired connection 80 shown in FIGS. 2A-2B, which may extend through any part of the head-mounted display 20 as needed to reach different components. The head-mounted display 20 may also be configured for wireless communication over a network, such as a cellular, Wi-Fi, Bluetooth, and/or satellite network, as well as any other wireless communication modality, using a communication component that is communicatively connected to computer processors associated with the head-mounted display 20. The communication component (e.g., which may include a radio and antenna) may also be configured to provide, in conjunction with a position-tracking component, location-tracking ability for the head-mounted display 20 through signal triangulation, a global positioning system (GPS) signal, or another tracking method. Additionally, each of the components of the head-mounted display 20 requiring power may be connected to the power source 30 through one or more power cables extending through the various parts of the head-mounted display 20.

Figure 2C:
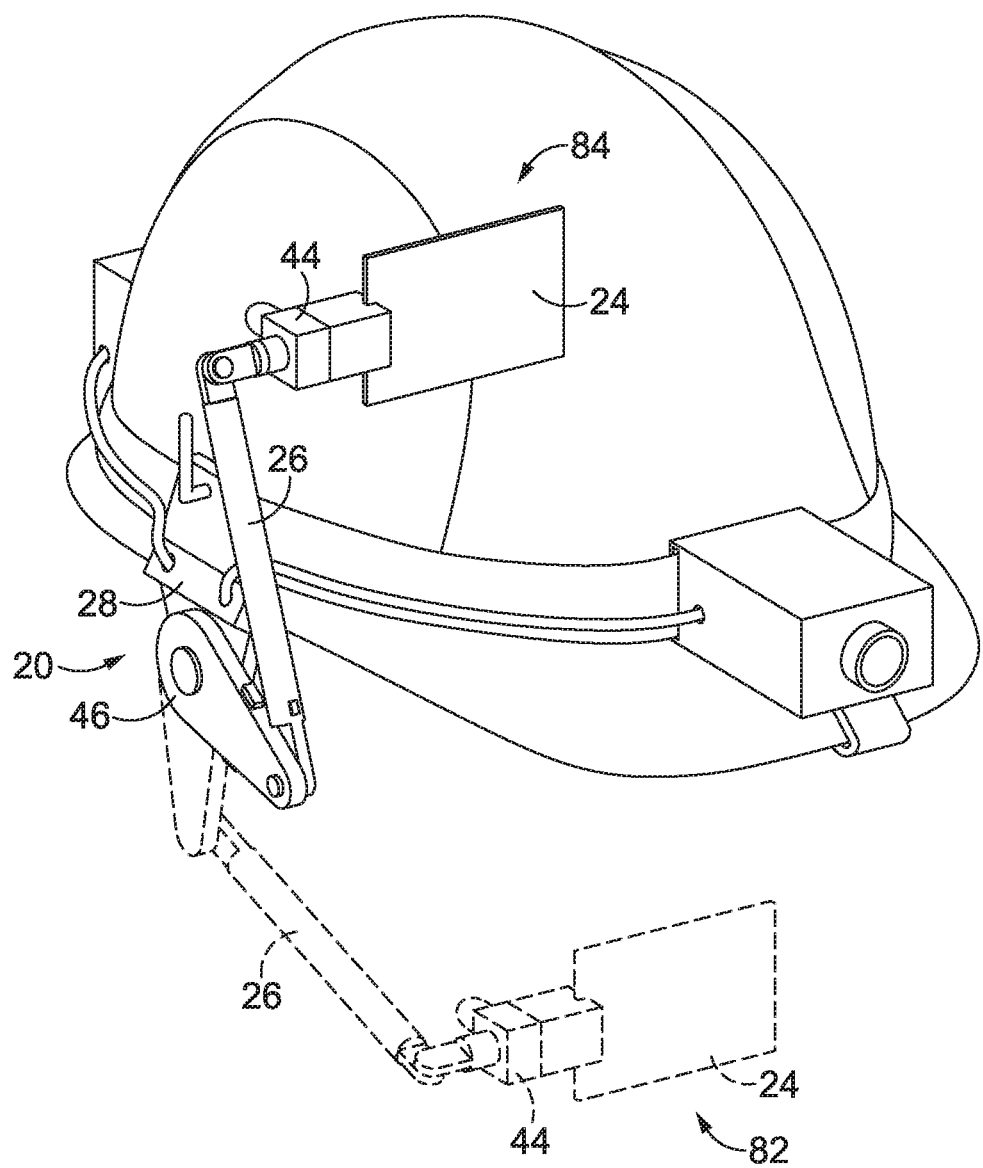
FIG. 2C depicts the head-mounted display of FIGS. 2A-2B with a display boom moved between different positions, in accordance with an embodiment of the present technology.

Referring to FIG. 2C, the display boom 26 of the head-mounted display 20 shown in FIGS. 2A-2B is provided in multiple positions, in accordance with an embodiment of the present technology. In FIG. 2C, the display boom 26 is moved from a first position 82 to a second position 84. The first position 82 may be considered a viewing position, at which the display module 24 is at least partially in front of a user's face, and the second position 84 may be considered a retracted position, at which the display module 24 is away from the user's face. At least one of the first and second positions 82, 84 may be user-configurable, and may result in activation, deactivation, and/or changed operation of one or more components of the head-mounted display 20.

In this respect, the head-mounted display 20 may be configured such that components and functions thereof can change depending on whether the display boom 26 is in the first position 82 or the second position 84. For example, when the display boom 26 is in the first position 82, the display module 24, including any components thereof (e.g., microphone, eye-tracking camera, display, etc.), may have full operation, and when the display boom 26 is in the second position 84, the display module 24 and any components thereof may be at least partially adjusted in operation (e.g., put into sleep mode to save power). Certain components, such as a position-tracking component, may remain in operation regardless of the adjustments to the display boom 26, depending on the configuration.

Figure 3A:
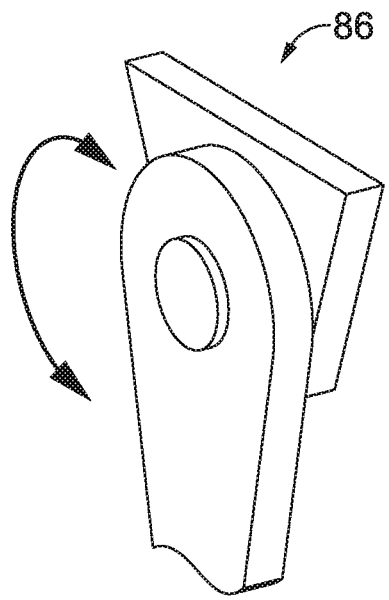
FIGS. 3A-3B depict exemplary movable couplings for a display boom of a head-mounted display, in accordance with embodiments of the present technology.
Figure 3B:
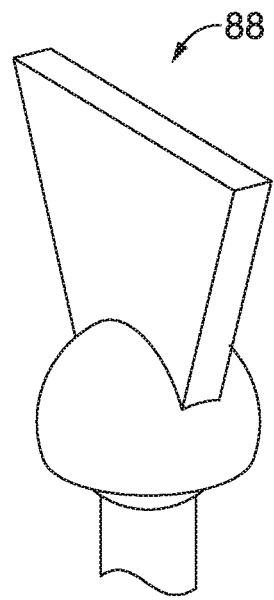

Referring to FIGS. 3A-3B, first and second movable couplings 86, 88 usable to attach a display boom, such as the display boom 26 shown in FIGS. 2A-2B, to a base of a head-mounted display, such as the base 28 of the head-mounted display 20 shown in FIGS. 2A-2B, are provided, in accordance with an embodiment of the present technology. The first movable coupling 86 shown in FIG. 3A is a rotatable coupling for providing rotational movement of a corresponding display boom, and the second movable coupling 88 shown in FIG. 3B is a ball-joint-type coupling for providing multi-axis movement of a corresponding display boom relative to a base.

Figure 3C:
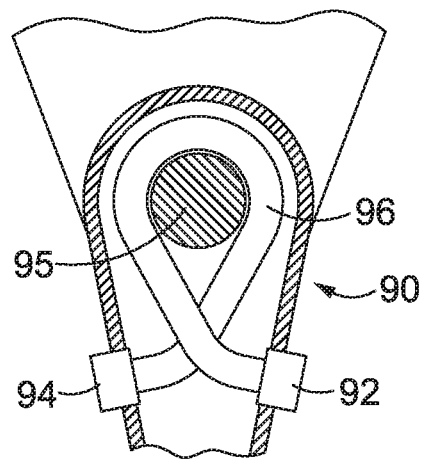
FIG. 3C depicts a partial, cross-section view of a releasable coupling for a display boom of a head-mounted display, in accordance with an embodiment of the present technology.
Figure 3D:
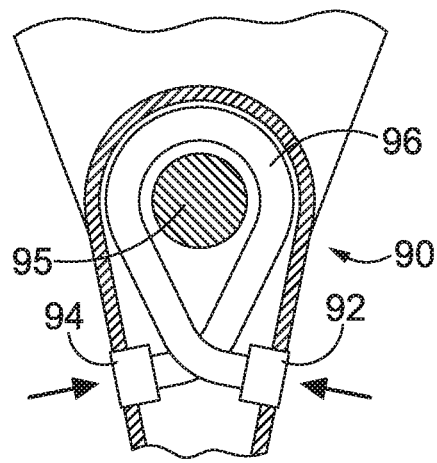
FIG. 3D depicts the releasable coupling of FIG. 3C engaged for releasing the display boom, in accordance with an embodiment of the present technology.

Referring to FIGS. 3C-3D, a partial, cross-section view of an exemplary releasable coupling 90 for a display boom of a head-mounted display, such as the display boom 26 of the head-mounted display 20 shown in FIGS. 2A-2B, is provided, in accordance with an embodiment of the present technology. In FIG. 3C, the releasable coupling 90 is a mechanical coupling having first and second releasing mechanisms 92, 94 that can be engaged (i.e., depressed) to decouple an engaging mount 96 from a base mount 95 to allow a display boom to be released from a head-mounted display. In this respect, the releasable coupling 90 is configured to move between a first securing position, as shown in FIG. 3C, and a second releasing position, as shown in FIG. 3D.

Figure 4B:
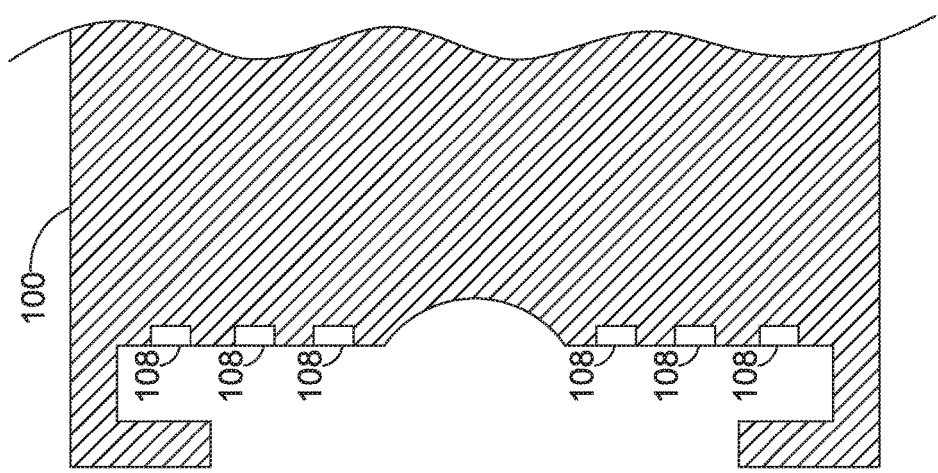
FIG. 4B is a partial, cross-section view of a component of a head-mounted display configured for securement to the strap depicted in FIG. 4A, in accordance with an embodiment of the present technology.
Figure 4A:
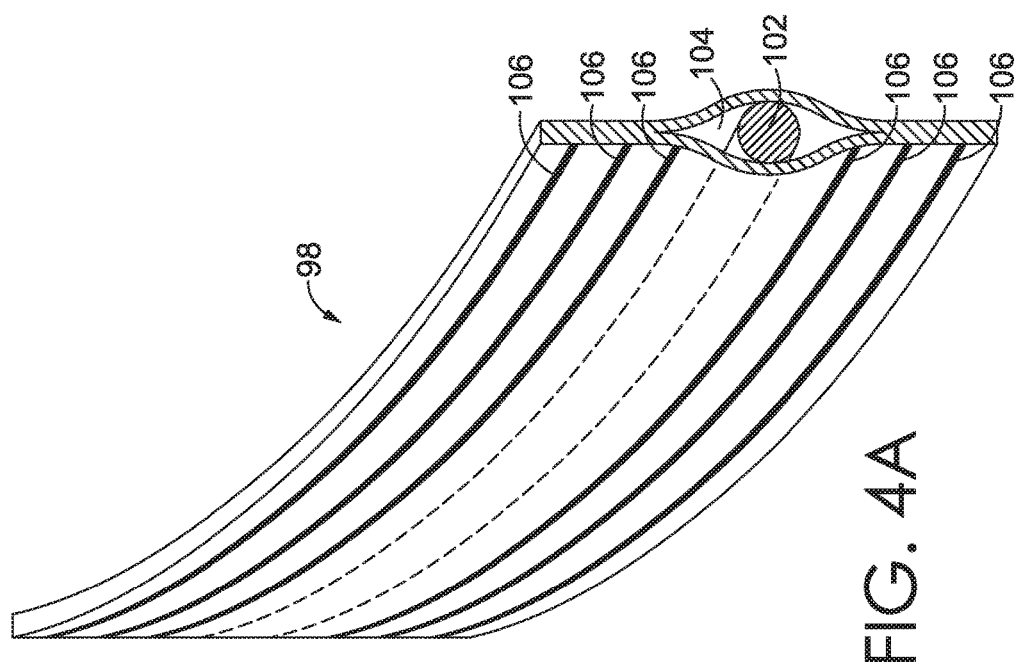
FIG. 4A is an angled, perspective, cross-section view of a strap of an attachment mechanism of a head-mounted display, in accordance with an embodiment of the present technology.

Referring to FIG. 4A, a cross-section view of a strap 98 for a head-mounted display, such as the head-mounted display 20 shown in FIGS. 2A-2B, is provided, in accordance with an embodiment of the present technology. The strap 98, of which only a portion is depicted in FIG. 4A, may be rigid, semi-rigid, non-rigid, and/or may include an elastic resilience. In some embodiments, the strap 98 may be permanently fixed to headwear, such as a helmet or hat. To this end, the strap 98 may function as more of a track for providing contacts for communication between various components, as will be described. The strap 98 can include a cable 102, which may be a power and/or communications cable, extending through a channel 104 within the strap 98. The strap 98 can also include a plurality of communication cables 106 exposed on an outer surface of the strap 98. The communication cables 106 may be configured to mateably attach to a corresponding plurality of communication contacts 108, as shown in FIG. 4B. It is contemplated that in some other embodiments, instead of a cable and channel, the strap 98 itself may include integrated conductive lines having at least partially exposed, conductive surfaces that can provide similar communicative transmission to a cable.

Referring to FIG. 4B, a partial, cross-section view of a component 100 of a head-mounted display, such as the head-mounted display 20 shown in FIGS. 2A-2B, is provided, in accordance with an embodiment of the present technology. The component 100 includes the corresponding plurality of communication contacts 108 configured to be mateably connected to the plurality of communication cables 106 located on the outer surface of the strap 98. Due to the extending and circumscribing nature of the plurality of communication cables 106 on the outer surface of the strap 98, the component 100, which may be, for example, the electronics module 32 depicted in FIGS. 2A-2B, may be secured to the strap 98 at a number of different locations while still maintaining a communicative connection. This flexibility in positioning the component 100 may more easily allow weight distribution of an associated head-mounted display to be accomplished.

Figure 5A:
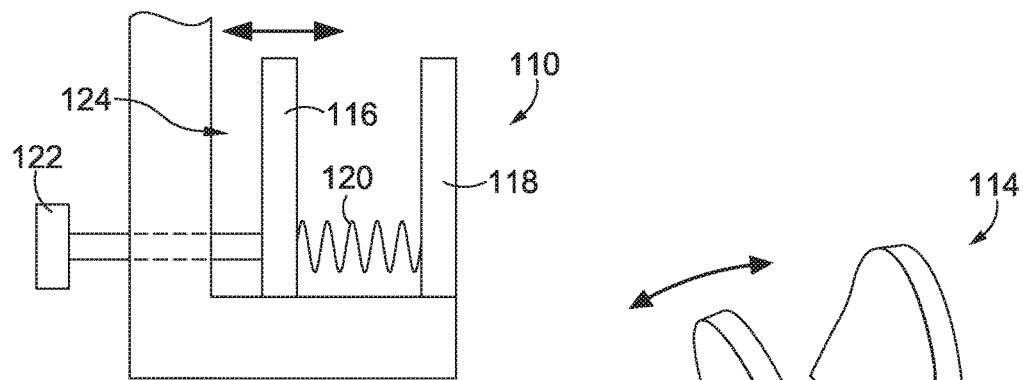
FIG. 5A depicts an exemplary spring-based tensioning mechanism, in accordance with an embodiment of the present technology.
Figure 5C:
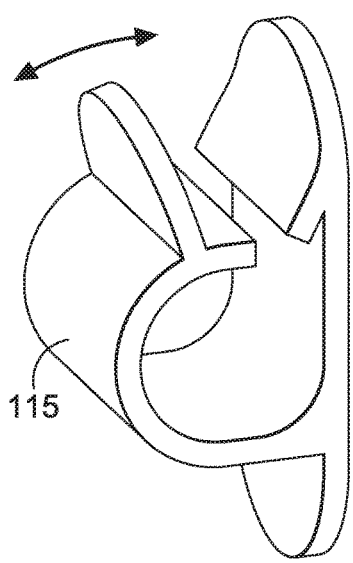
FIG. 5C depicts an elastically-deformable tensioning mechanism, in accordance with an embodiment of the present technology.
Figure 5B:
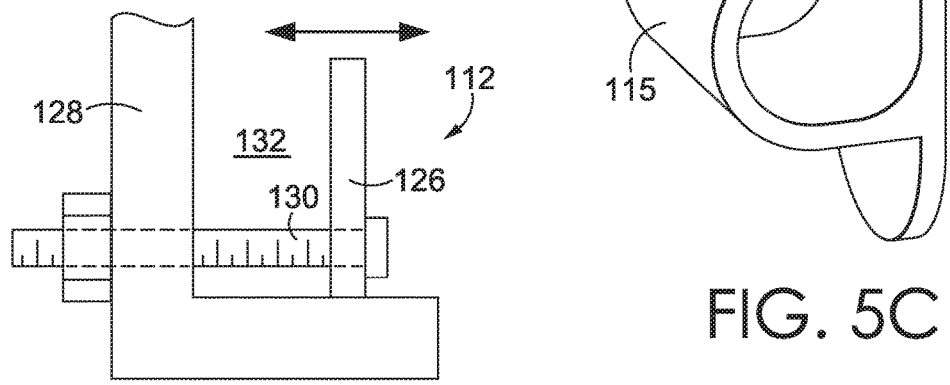
FIG. 5B depicts an exemplary screw-based tensioning mechanism, in accordance with an embodiment of the present technology.

Referring to FIGS. 5A-5C, a variety of exemplary tensioning mechanisms 110, 112, 114 that may be used to attach components of a head-mounted display to an item of headwear are provided, in accordance with an embodiment of the present technology. FIG. 5A depicts an exemplary spring-based tensioning mechanism 110, which includes a movable element 116, a fixed element 118, a plunger 122, and a spring 120 that biases the movable element 116 and the fixed element 118 away from each other, controlling a size of a channel 124 formed in the spring-based tensioning mechanism 110, allowing for engagement with an item of headwear.

FIG. 5B depicts a screw-based tensioning mechanism 112 that includes a movable element 126, a fixed element 128, and a screw 130. A channel 132 is formed between the movable element 126 and the fixed element 128, and the screw 130 may be used to bias the movable element 126 towards the fixed element 128 to change the size of the channel 132 to provide a force against an edge of an item of headwear positioned in the channel 132, allowing the tensioning mechanism to be secured to the item of headwear.

FIG. 5C depicts an elastically deformable tensioning mechanism 114 that includes an elastically deformable element 115, which may be formed from any material that provides an elastic resistance when biased (e.g., flexible plastic, rubber, etc.). The elastically deformable tensioning mechanism 114 may be pulled open to engage an edge of an item of headwear, and then released to provide a force against the edge of the item of headwear to attach the elastically deformable tensioning mechanism 114 to the same. It should be noted that the tensioning mechanisms 110, 112, 114 shown in FIGS. 5A-5C are merely exemplary, and other tensioning mechanisms, including those with different attachment configurations (e.g., magnetic, adhesive, buttons, hook-and-loop fasteners, harnesses, etc.) are possible and contemplated in addition to the examples provided herein.

Figure 6A:
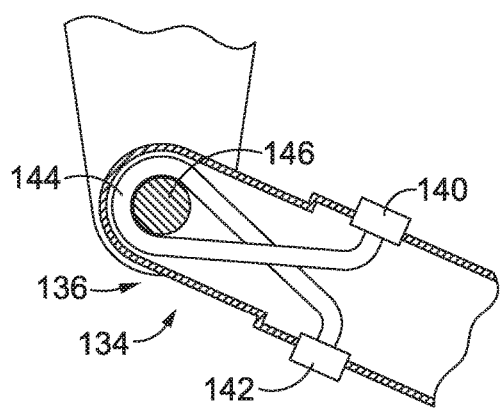
FIG. 6A depicts a partial, cross-section view of a releasable coupling for a display boom, in accordance with an embodiment of the present technology.
Figure 6B:
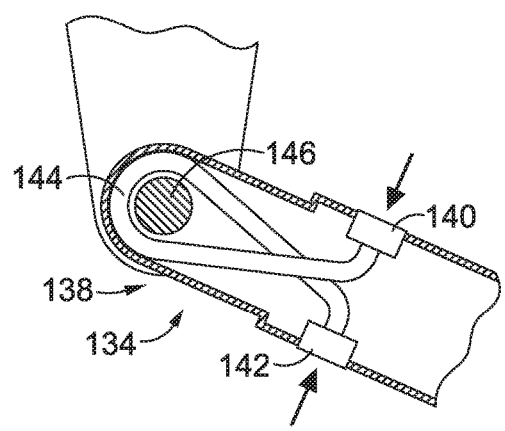
FIG. 6B depicts the releasable coupling of FIG. 6A engaged to release a portion of the display boom, in accordance with an embodiment of the present technology.

Referring to FIGS. 6A-6B, a partial, cross-section view of a releasable coupling 134 for a display boom of a head-mounted display, such as the display boom 26 of the head-mounted display 20 shown in FIGS. 2A-2B, is provided, in accordance with an embodiment of the present technology. The releasable coupling 134 shown in FIGS. 6A-6B is a mechanical coupling, the components of which are movable between a first securing position 136, as shown in FIG. 6A, and a second releasing position 138, as shown in FIG. 6B. Movement between the first and second positions 136, 138 occurs through engagement of first and second releasing mechanisms 140, 142, which, when engaged as shown in FIG. 6B, decouple an engaging mount 144 of the releasable coupling 134 from a base mount 146. It should be noted that the releasing mechanism 134 depicted in FIGS. 6A-6B is exemplary, and other configurations (e.g., having mechanical couplings, magnetic couplings, male-female couplings, etc.) are possible and contemplated herein.

Referring to FIGS. 7A-7B, an exemplary strap-based tensioning mechanism 148 for a head-mounted display, such as the head-mounted display 20 shown in FIGS. 2A-2B, is provided, in accordance with an embodiment of the present technology. The strap-based tensioning mechanism 148 may be used to tighten or secure a strap, such as the strap 70 shown in FIGS. 2A-2B, against an item of headwear, such as a helmet. The strap-based tensioning mechanism 148 may be configured to move between a first configuration 150 providing a first strap circumference, as shown in FIG. 7A, and a second configuration 152 providing a second strap circumference, as shown in FIG. 7B, the second circumference being smaller than the first circumference for tightening against the associated item of headwear.

Figure 8A:
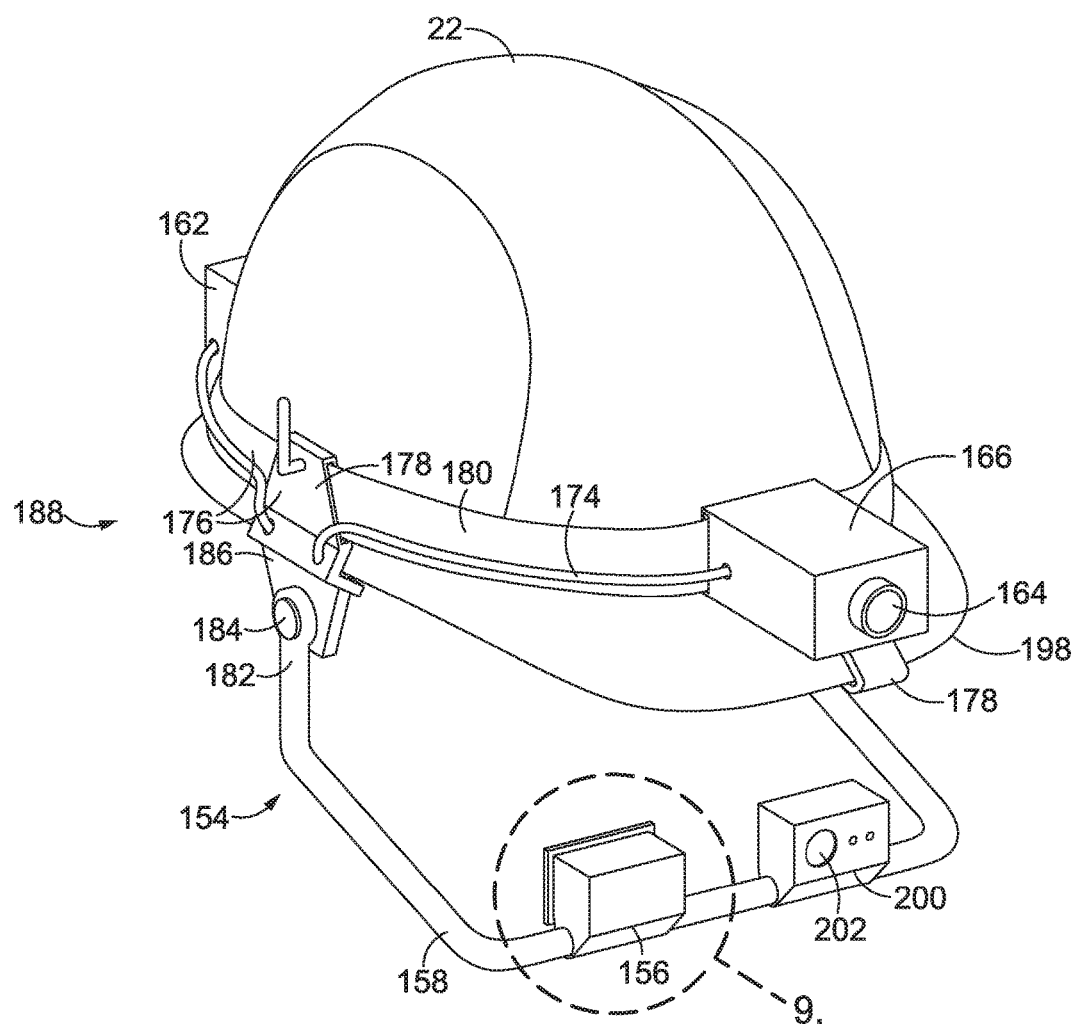
FIGS. 8A-8B depict an exemplary head-mounted display mounted on an item of headwear, in accordance with an embodiment of the present technology.
Figure 8B:
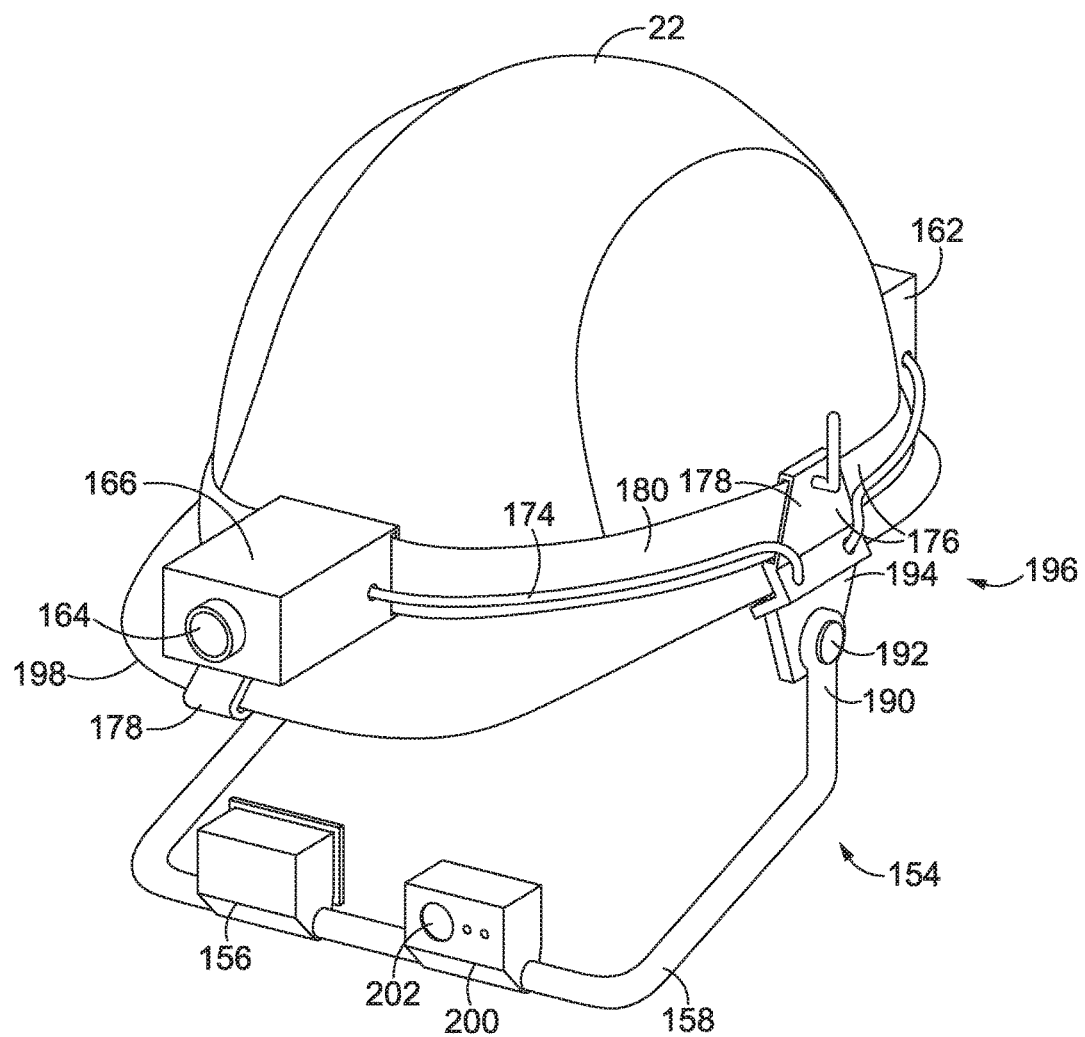

Referring to FIGS. 8A-8B, another exemplary head-mounted display 154 is provided, in accordance with an embodiment of the present technology. The head-mounted display 154 shown in FIGS. 8A-8B is mounted on the item of headwear 22 that is also depicted in FIGS. 2A-2B, and includes a display module 156, a display boom 158, a power source 162, a camera 164, and an electronics module 166. The electronics module 166 may include a computer processor, a communication component, a position-tracking component, and/or other integrated system components in a consolidated configuration. It should also be noted that, in different configurations, the components associated with the electronics module 166 may be distributed about the head mounted display 154, rather than consolidated, as shown in FIGS. 8A-8B.

A communication cable 174 is provided that extends from the electronics module 166, through the display boom 158, and to the display module 156, to provide communication between the display module 156 and the one or more computer processors located within the electronics module 166. The head-mounted display 154 also includes an attachment mechanism 176 for securing the display boom 158 to the item of headwear 22. The attachment mechanism 176 includes rigid coupling elements 178 that attach to edges of the item of headwear 22, and a strap 180 which, in conjunction with the rigid coupling elements 178, may be used to secure the display boom 158, the electronics module 166, and the power source 162 to the headwear 22.

As shown in FIGS. 8A-8B, the display boom 158 includes a first end 182 attached to a first rotatable coupling 184 and a second end 190 attached to a second rotatable coupling 192. The first rotatable coupling 184 is mounted on a first rigid coupling element 186 of the attachment mechanism 176 that is secured to a first side 188 of the headwear 22, and the second rotatable coupling 192 is attached to a second rigid coupling element 194 that is secured to a second side 196 of the headwear 22.

The display module 156 shown in FIGS. 8A-8B is coupled to the display boom 158 between the first end 182 and the second end 190 of the display boom 158. Additionally, the display boom 158 is movable (i.e., rotatable) about the first and second rotatable couplings 184, 192. This movement allows a user to move the display boom 158 between a first position (shown in FIGS. 8A and 8B) where the display module 156 is positioned in front of a user's face, and a second position, where the display boom 158 and display module 156 are at least partially away from the user's face (e.g., folded up over a brim 198 of the headwear 22).

The display boom 158 of the head-mounted display 154 shown in FIGS. 8A-8B further includes a component module 200 attached adjacent to the display module 156. The component module 200 may provide additional components and functionality, such as a forward-facing camera 202 (e.g., standard, infrared, and/or night vision) for capturing images and/or video, a rearward-facing camera for tracking eye movement of a user (see FIG. 16C for an example), different sensors and detectors (e.g., a temperature sensor, air-quality sensor, radiation sensor, etc.) for detecting environmental conditions, and/or any other components for a particular application.

Figure 9A:
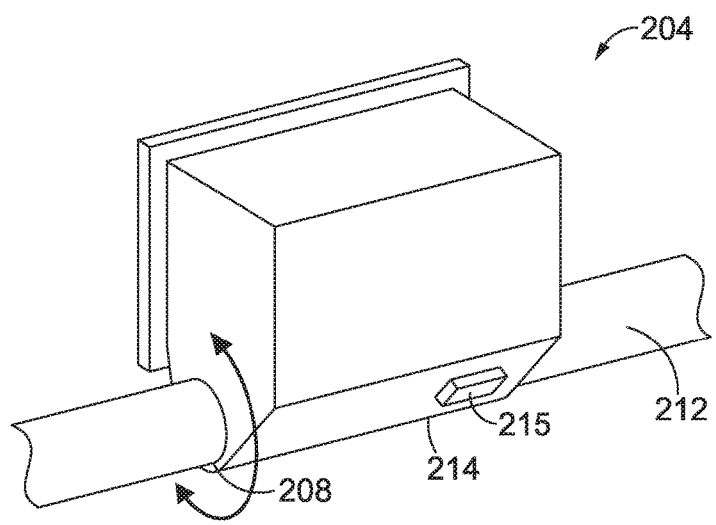
FIGS. 9A-9B depict exemplary display modules, in accordance with embodiments of the present technology.
Figure 9B:
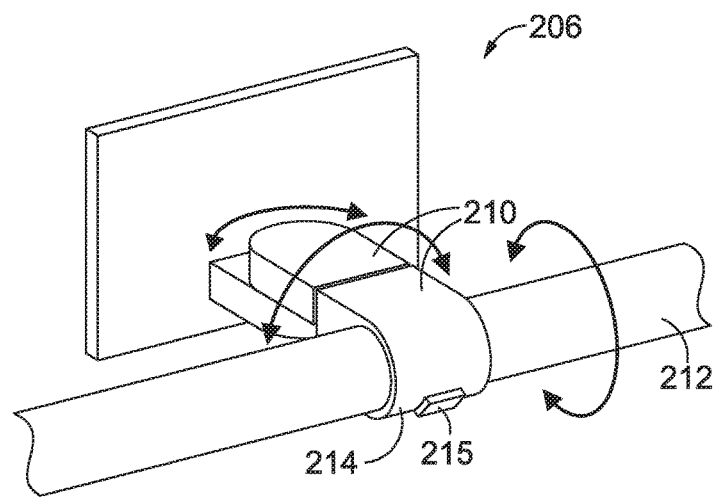

Referring to FIGS. 9A-9B, exemplary first and second display modules 204, 206 alternatively coupled to a display boom 212 are provided, in accordance with embodiments of the present technology. In FIG. 9A, the first exemplary display module 204 is coupled to the display boom 212 with a first movable attachment 208. The first display module 204 depicted in FIG. 9A includes a non-transparent display (e.g., a micro display, which may comprise at least one of a LCD, LED display, OLED display, DLP display, etc.) that is adjustable relative to the display boom 212, which may be similar to the display boom 158 shown in FIGS. 8A-8B. The first display module 204 further includes a locking mechanism 214, which may be engaged to allow the first display module 204 to rotate relative to the display boom 212 (e.g., by pressing the button 215), and then disengaged to allow the first display module 204 to remain in a fixed position relative to the display boom 212 (e.g., by releasing the button 215).

In FIG. 9B, the second exemplary display module 206 is coupled to the display boom 212 with a second movable attachment 210. The second display module 206 includes an optic that is transparent, partially transparent, and/or selectively transparent, and may be configured to provide an augmented reality display in which text, images, and/or other objects are shown in conjunction with a real-time environment viewed by a user through the optic (e.g., the optic may be a waveguide optic). The second movable attachment 210 allows the second display module 206 to move relative to the display boom 212 in a number of different directions. The second display module 206 may be fixed relative to the display boom 212 using the locking mechanism 214 and button 215, as discussed with respect to FIG. 9A. It should be noted that the locking mechanism 214 may or may not be used, and retaining the position of the first and second display modules 204, 206 relative to the display boom 212 may be provided through frictional resistance from the first and second movable attachments 208, 210.

Figure 10:
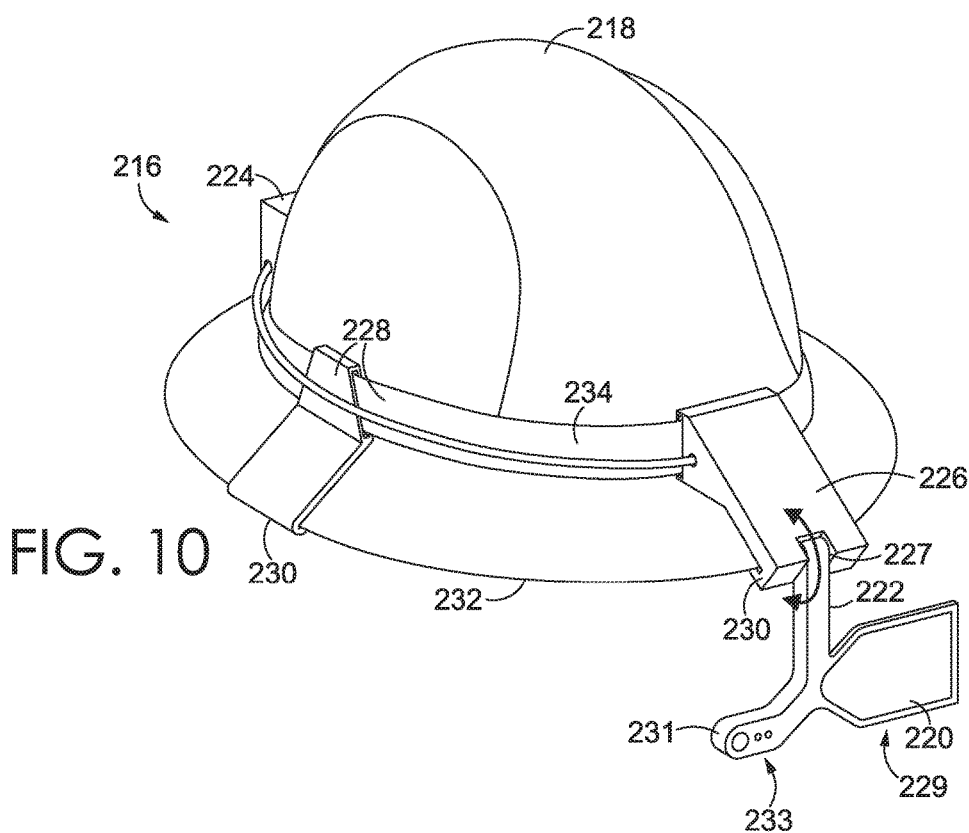
FIG. 10 depicts an exemplary head-mounted display mounted on an item of headwear, in accordance with an embodiment of the present technology.

Referring to FIG. 10, another exemplary head-mounted display 216 mounted to an item of headwear 218 is provided, in accordance with an embodiment of the present technology. In FIG. 10, the head-mounted display 216 includes a display module 220, a display boom 222, a power source 224, and an electronics module 226, which may include one or more computer processors, position-tracking components, communication components, etc., in addition to other possible or alternative components. Components of the electronics module 226 may also be distributed about the head-mounted display 216, rather than consolidated in the electronics module 226 as in FIG. 10. The head-mounted display 216 also includes an attachment mechanism 228 having rigid coupling elements 230 and a strap 234, the rigid coupling elements 230 configured to engage edges 232 of the headwear 218, and the strap 234 configured to secure the rigid coupling elements 230 and the components of the head-mounted display 216 circumferentially about the headwear 218.

FIG. 10 depicts a configuration having the display module 220 and the display boom 222 mounted on a front portion of the headwear 218, which in FIG. 10 is a full-brim-type helmet. The display boom 222 is also coupled to the electronics module 226 with a rotatable coupling 227, which allows the display module 220 to be rotated up and down between a first position in front of a user's face (shown in FIG. 10) and a second position that is at least partially away from a user's face. The display module 220 is also positioned at an end of the display boom 222 off to a first side 229, and an additional component module 231 (e.g., which may include forward and/or rearward-facing cameras, sensors, microphones, etc.) is coupled to the display boom 222 and positioned off to a second side 233.

Figure 11:
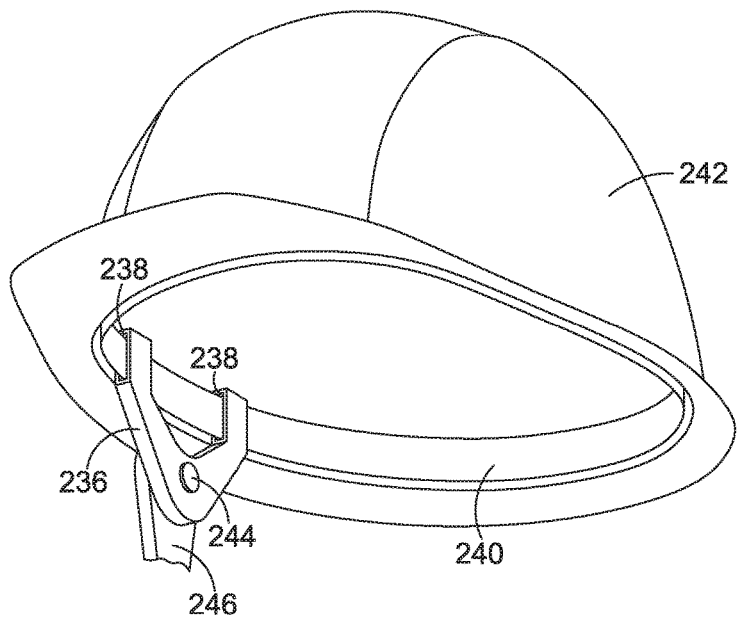
FIG. 11 depicts a harness-coupling component attached to an item of headwear, in accordance with an embodiment of the present technology.

Referring to FIG. 11, an exemplary harness-coupling component 236 for attaching a head-mounted display to an item of headwear 242 is provided, in accordance with an embodiment of the present technology. The harness-coupling component 236 includes a plurality of receiving-channels 238 which are attachable to a harness-structure 240 of the item of headwear 242. The harness-coupling component 236 is further coupled to a base 244, which may be movably coupled to a display boom 246 (only partially shown), which may be similar to the display boom 26 shown in FIGS. 2A-2B. The harness-coupling component 236 may be used in conjunction with other components of an attachment mechanism, such as those of the attachment mechanism 66 shown in FIGS. 2A-2B.

Figure 12A:
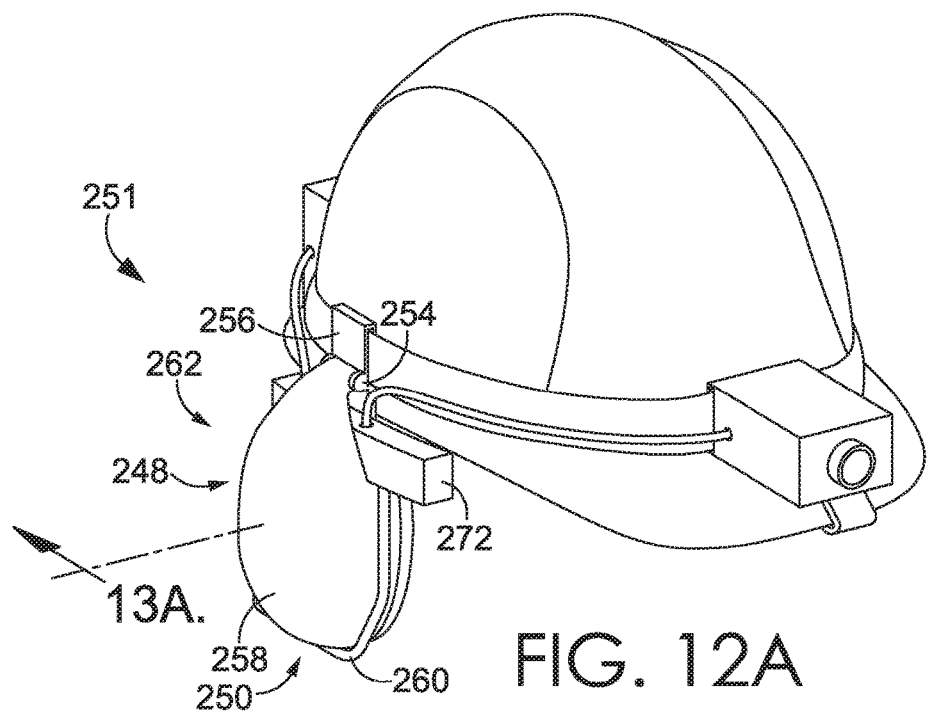
FIGS. 12A-12B depict an exemplary sound-dampening ear-cover assembly without a display boom, in accordance with an embodiment of the present technology.
Figure 12B:
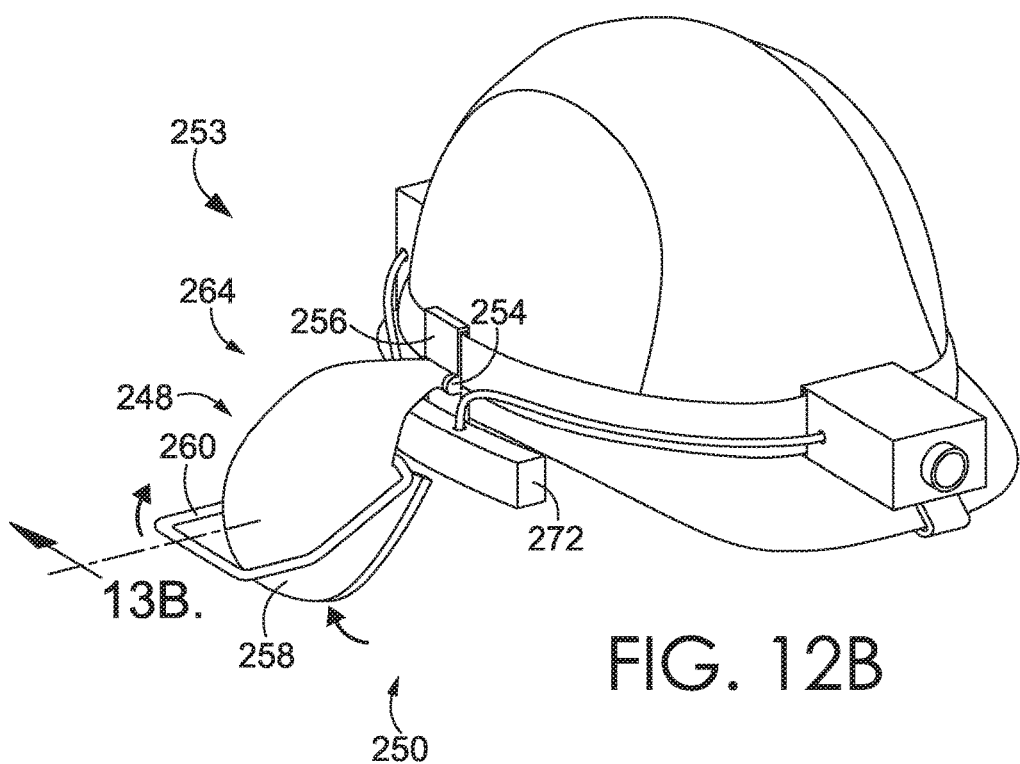

Referring to FIGS. 12A-12B, a partial depiction of an exemplary head-mounted display 248 that includes a sound-dampening ear-cover assembly 250 is provided, in accordance with an embodiment of the present technology. In addition to head-mounted displays and attachment mechanisms for headwear such as helmets, embodiments herein may be configured for use with other protective and/or utility-based equipment, such as eye, ear, face, and/or head protection. In this respect, the head-mounted displays discussed herein may be configured to satisfy various safety standards, such as those outlined in Section 5(a)(1) of the Occupation Safety and Health Act ("OSHA"), as well as 29 C.F.R. 1910.95 for hearing protection, 29 C.F.R. 1910.135 for head protection, and 29 C.F.R. 1910.33 for eye and face protection, in addition to other standards.

Returning to FIGS. 12A-12B, the sound-dampening ear-cover assembly 250 includes a first portion 256 and a second portion 258 that are movably coupled to each other with a rotatable coupling 254. The sound-dampening ear-cover assembly 250 further includes a lever 260 that can be used to move the sound-dampening ear-cover assembly 250 between a first configuration 262, shown in FIG. 12A, where the first and second portions 256, 258 are in a first position 251 relative to each other, and a second configuration 264, as shown in FIG. 12B, where the first and second portions 256, 258 are in a second position 253 relative to each other (the positions 251, 253 depicted in FIGS. 12A and 12B are merely exemplary). The lever 260 may be attached to the first portion 256, the second portion 258 (as shown in FIGS. 12A-12B), and/or the rotatable coupling 254, in exemplary embodiments. In the first configuration 262, the second portion 258 is in a relatively lowered position, where it may abut and/or be compressed against a side of a wearer's head, such that it substantially encloses a wearer's ear within the sound-dampening ear-cover assembly 250. In the second configuration 264, the second portion 258 is in a relatively raised position, such that it may be moved away from the wearer's head (relative to the first configuration 262), to more fully expose a wearer's ear from within the sound-dampening ear-cover assembly 250.

As a result, the head-mounted display 248 depicted in FIGS. 12A-12B provides the option of securing the second portion 258 against or towards a wearer's head to provide greater sound protection by more fully enclosing the wearer's ear, and also, moving the second portion 258 away from the wearer's head with the lever 260 to provide less sound protection by less fully enclosing the wearer's ear, relatively speaking. In additional embodiments, latches, clips, straps, and/or other securement components may be used for securing the first and second portions 256, 258 in the first position 251 and/or the second position 253, or in other positions. The head-mounted display 248 shown in FIGS. 12A-12B also includes a mounting portion 272 that extends through the sound-dampening ear-cover assembly 250. The mounting portion 272 may integrally include one or more components of the head-mounted display 248 (e.g., one or more computer processors and/or communication components) and may provide an attachment point for mounting a display boom, as discussed further with respect to FIGS. 14A-14B.

Referring to FIGS. 13A-13B, a cross-section of the sound-dampening ear-cover assembly 250 depicted in FIGS. 12A-12B is provided, in accordance with an embodiment of the present technology. As shown in FIG. 13A, when the sound-dampening ear-cover assembly 250 is in the first configuration 262, the first and second portions 256, 258 are in the first position 251, with the second portion 258 in a relatively lowered position, allowing it to at least partially surround and/or enclose a wearer's ear 265. As shown in FIG. 13B, when the sound-dampening ear-cover assembly 250 is in the second configuration 264, the first and second portions 256, 258 are in the second position 253, with the second portion 258 at least partially separated, displaced, and/or moved away from the wearer's ear 265 (i.e., angled away relative to the first position 251) to more fully expose the wearer's ear 265 from within the sound-dampening ear-cover assembly 250, thereby providing less sound protection compared to the first configuration 262.

Figure 14A:
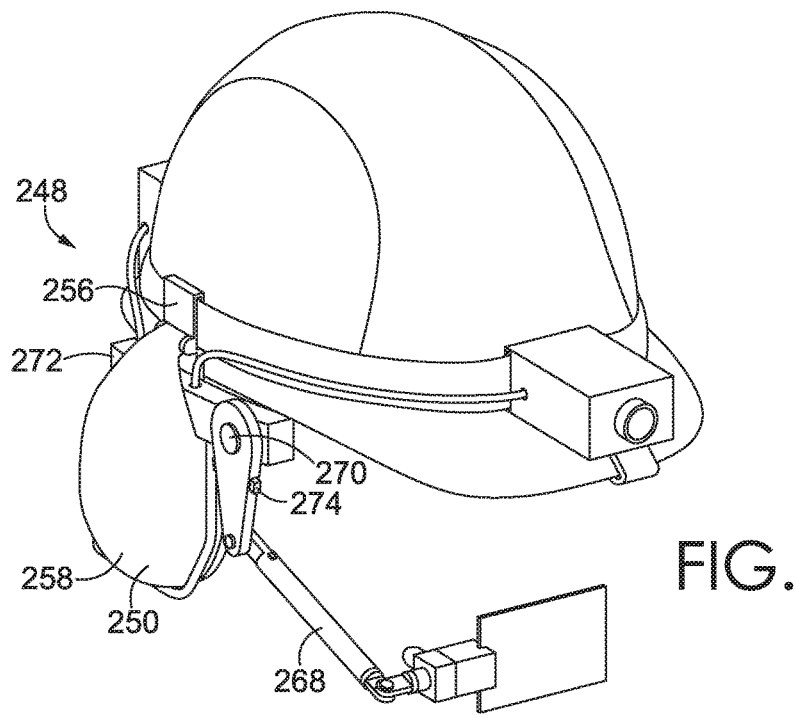
FIGS. 14A-14B depict the sound-dampening ear-cover assembly of FIGS. 12A-12B with a display boom mounted at different locations, in accordance with an embodiment of the present technology.
Figure 14B:
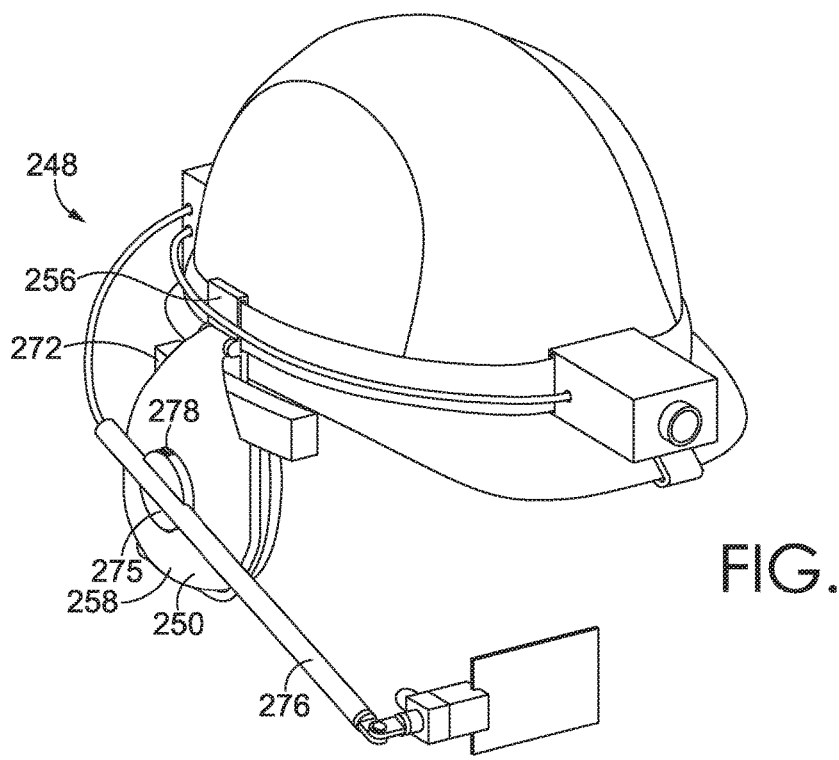

Referring to FIGS. 14A-14B, the head-mounted display 248 depicted in FIGS. 12A-12B is again provided with exemplary display boom attachments, in accordance with embodiments of the present technology. In FIG. 14A, a first display boom 268 is provided, which is secured to the mounting portion 272 of the head-mounted display 248 with a rotatable coupling 270. The first display boom 268 further includes a releasable coupling 274 that allows the first display boom 268 to be secured/released from the rotatable coupling 270 (e.g., for replacement with another type of display boom). The releasable coupling 274 may be similar to the releasable coupling 134 shown in FIGS. 6A-6B.

In FIG. 14B, a second display boom 276 is provided, which is secured to the sound-dampening ear-cover assembly 250. The second display boom 276 is movably coupled to the second portion 258 of the sound-dampening ear-cover assembly 250 with a rotatable coupling 275. The second display boom 276 also includes a releasable coupling 278, which may be similar to the releasable coupling 134 shown in FIGS. 6A-6B, that allows the second display boom 276 to be secured/released from the sound-dampening ear-cover assembly 250. It should be noted that the display booms 268, 276 and mounting configurations thereof shown in FIGS. 14A-14B are merely exemplary, and other configurations and locations are possible and contemplated.

Referring to FIG. 15A, a first releasable coupling 280 for attaching a display module 284 to a display boom 286 of a head-mounted display, such as the head-mounted display 20 show in FIGS. 2A-2B, is provided, in accordance with an embodiment of the present technology. In FIG. 15A, the first releasable coupling 280 is a mechanical coupling having a male-female connector 292 and a releasing mechanism 294. The releasable coupling 280 includes a first mateable coupling 288 located at an end of the display boom 286, and a second mateable coupling 290 located on the display module 284. The first and second mateable couplings 288, 290 can be releasably secured to each other to attach the display module 284 to the display boom 286. Additionally, the first releasable coupling 280 may be configured such that a different display module having a separate mateable coupling, which is configured like the second mateable coupling 290 shown in FIG. 15A, may be joined to the first mateable coupling 288 in order to utilize a display module with a different corresponding display characteristic than the display module 284.

Referring to FIG. 15B, a second releasable coupling 282 for attaching a display module 285 to a display boom 287 of a head-mounted display, such as the head-mounted display 20 show in FIGS. 2A-2B, is provided, in accordance with an embodiment of the present technology. In FIG. 15B, the second releasable coupling 282 is magnetic-based and includes a first mateable coupling 296 with a first magnetic polarity and a second mateable coupling 298 with a second magnetic polarity that is opposite to the first magnetic polarity, such that, as a result, the first and second mateable couplings 296, 298 are magnetically attracted to each other. This allows magnetic attachment of the display module 285 to the display boom 287. It should be noted that, as with the first releasable coupling 280 shown in FIG. 15A, the second releasable coupling 282 may be configured such that a different display module having a separate mateable coupling, which is configured like the second mateable coupling 298 shown in FIG. 15B, may be joined to the first mateable coupling 296 in order to utilize a display module with a different corresponding display characteristic than the display module 285.

In this regard, it should be noted that exchanging one display module for another display module having a different corresponding display characteristic may result in the computer processor(s) of an associated head-mounted display adapting to the new display characteristic. For example, different display modules having different corresponding display characteristics may each have hardware identifiers and/or embedded metadata that, when detected by a processor of a head-mounted display, such as upon attachment of a display module with a releasable coupling, may cause the processor to load appropriate drivers to reconfigure the visual output to appropriately function with the new display module. As another example, a user might manually load appropriate drivers and/or display configurations for one or more display modules that may be connected to a head-mounted display, or for a currently connected/used display module. Additionally, a processor of a head-mounted display may store, such as in memory, a number of different drivers and/or applications configured to adapt the various functions of the head-mounted display to a display characteristic of an attached display module.

Figure 16A:
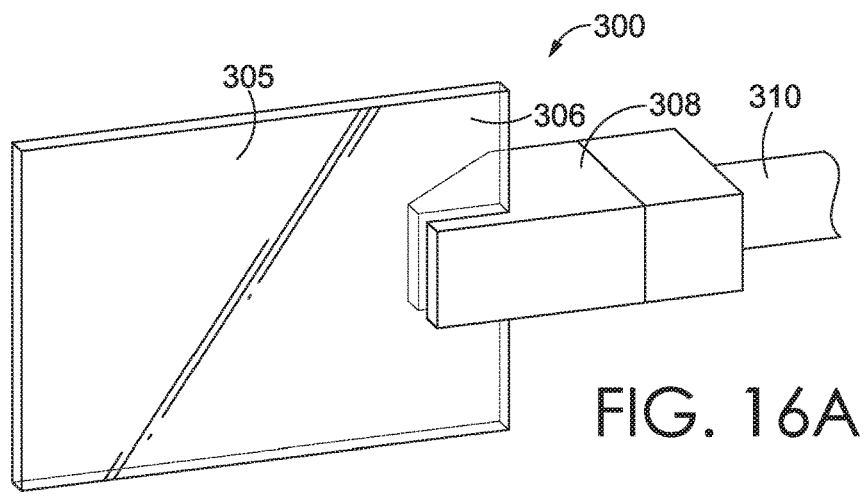
FIGS. 16A-16C depict a variety of display modules each having a different display characteristic, in accordance with embodiments of the present technology.
Figure 16B:
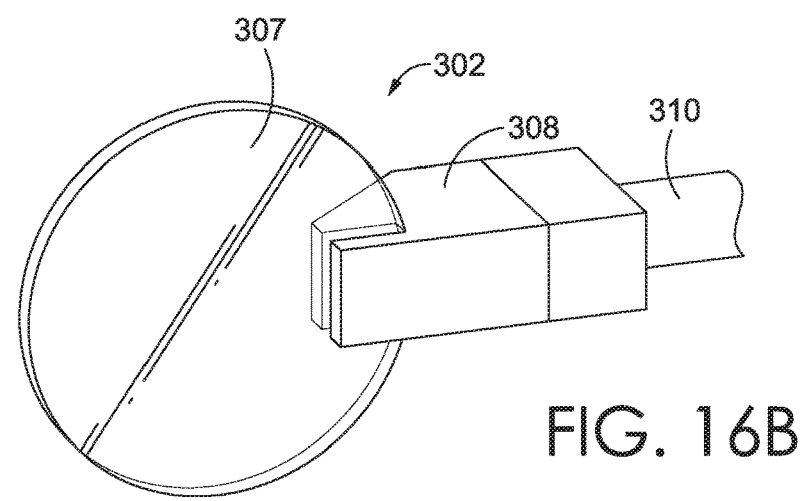
Figure 16C:
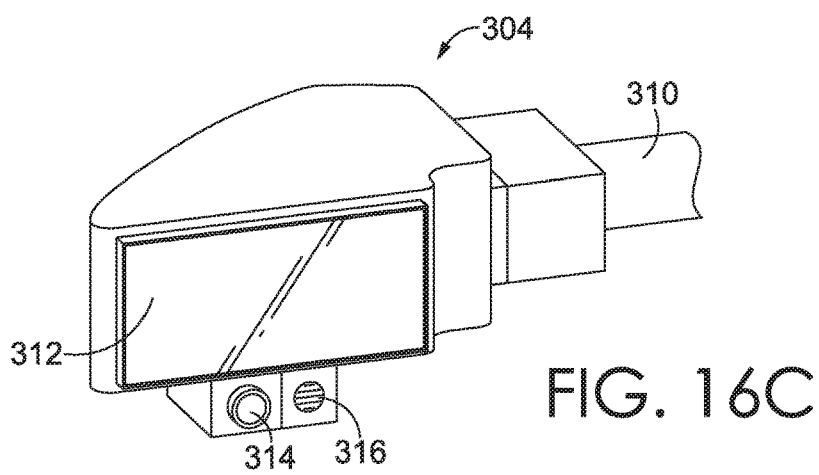

Referring to FIGS. 16A-16C, a variety of display modules 300, 302, 304 having different corresponding display characteristics are provided, in accordance with embodiments of the present technology. FIG. 16A depicts a first display module 300 that includes a first display portion 306 coupled to a base 308. The first display portion 306 comprises a first waveguide optic 305 that may be transparent, partially transparent, and/or selectively transparent (e.g., for providing images, text, and/or other visual elements thereon in an augmented reality display). The base 308 may include a mateable coupling, such as the second mateable coupling 298 shown in FIG. 15B, allowing it to be attached interchangeably to a display boom 310, which may include a corresponding mateable coupling, such as the first mateable coupling 296 shown in FIG. 15B. FIG. 16B depicts a second display module 302 that comprises a second waveguide optic 307 with a circular shape to provide a different field of view than the first waveguide optic 305 shown in FIG. 16A. The second waveguide optic 307 is once again secured to the base 308, which is attached to the display boom 310.

FIG. 16C depicts a third display module 304 that includes a display portion 312 that is non-transparent (e.g., a micro display, which may comprise at least one of a LCD, LED display, OLED display, DLP display, etc.) for displaying text, images, and/or other objects (e.g., a PDF with black text on white background). The third display module 304 is attached to the display boom 310 and further includes a user-facing camera 314, which may be used to track eye movement of a user wearing the third display module 304 (e.g., for document navigation), and a microphone 316, which may be used for receiving audio input from a user (e.g., voice commands, communications over a wireless network connection, etc.). It should be noted that any of the head-mounted displays and display modules discussed in this disclosure may include a user-facing camera for tracking eye movement and/or a microphone for receiving audio input, in addition to other components and features.

Figure 17A:
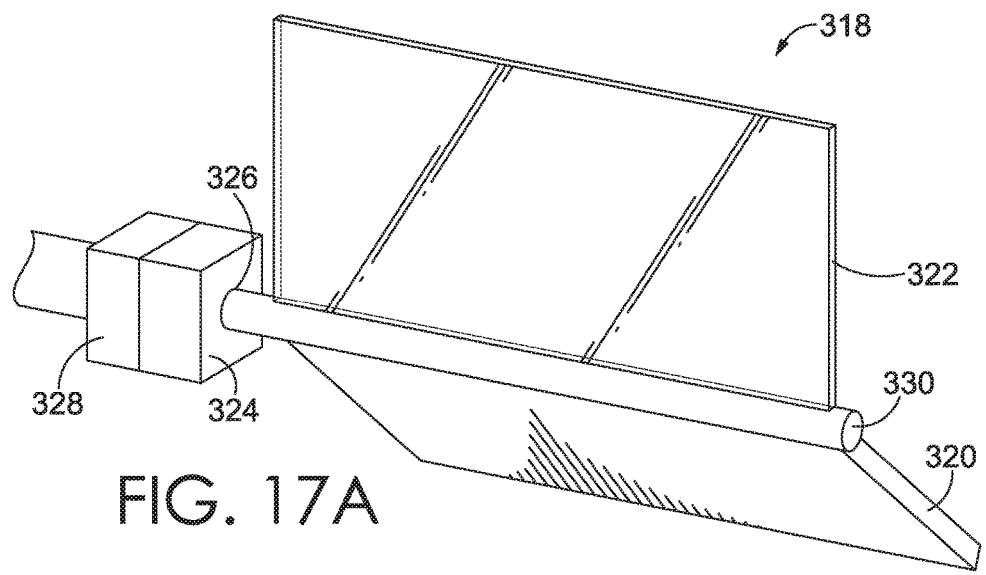
FIGS. 17A-17B depict a display module having multiple display portions, in accordance with an embodiment of the present technology.
Figure 17B:
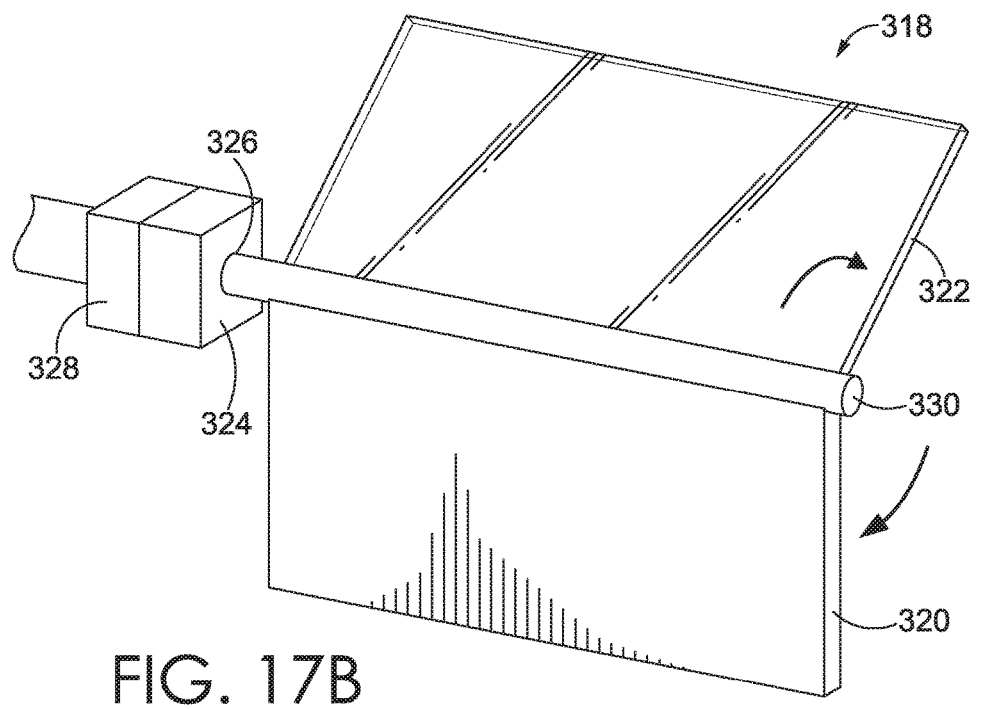

Referring to FIGS. 17A-17B, an exemplary display module 318 having first and second display portions 320, 322 is provided, in accordance with an embodiment of the present technology. The first and second display portions 320, 322 are secured to each other, and also, rotatably coupled to a base 324 with a rotatable coupling 326. The base 324 is releasably attached to an end of a display boom 328. The first and second display portions 320, 322 are coupled to each other at an angle, such that the first and second display portions 320, 322 are non-coplanar relative to each other. As a result, when positioned in front of a user's face, the first and second display portions 320, 322 may each remain more angled towards a user's eye than if the first and second display portions 320, 322 were coplanar. The angle of the first and second display portions 320, 322 may be configured based on a user's needs or preference. The first display portion 320 may comprise a micro display and the second display portion 322 may comprise a waveguide optic, allowing multiple visual displays to be provided on the display module 318. In addition, the display module 318 may be activated, deactivated, and/or otherwise have its function modified by rotating the first and second display portions 320, 322 in unison about a common axis 330, as shown in FIG. 17B.

Figure 18A:
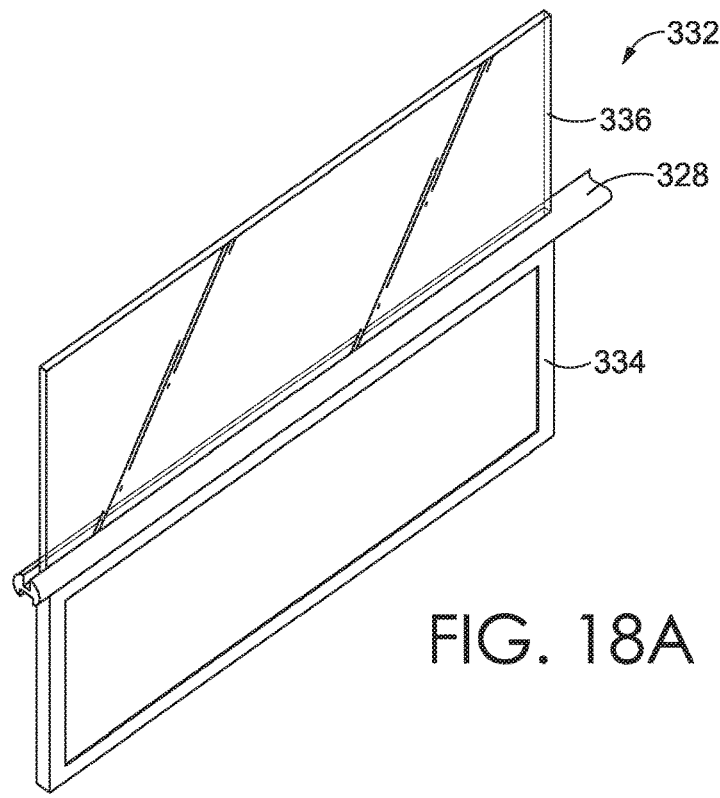
FIGS. 18A-18B depict a display module with interchangeable display portions, in accordance with an embodiment of the present technology.
Figure 18B:
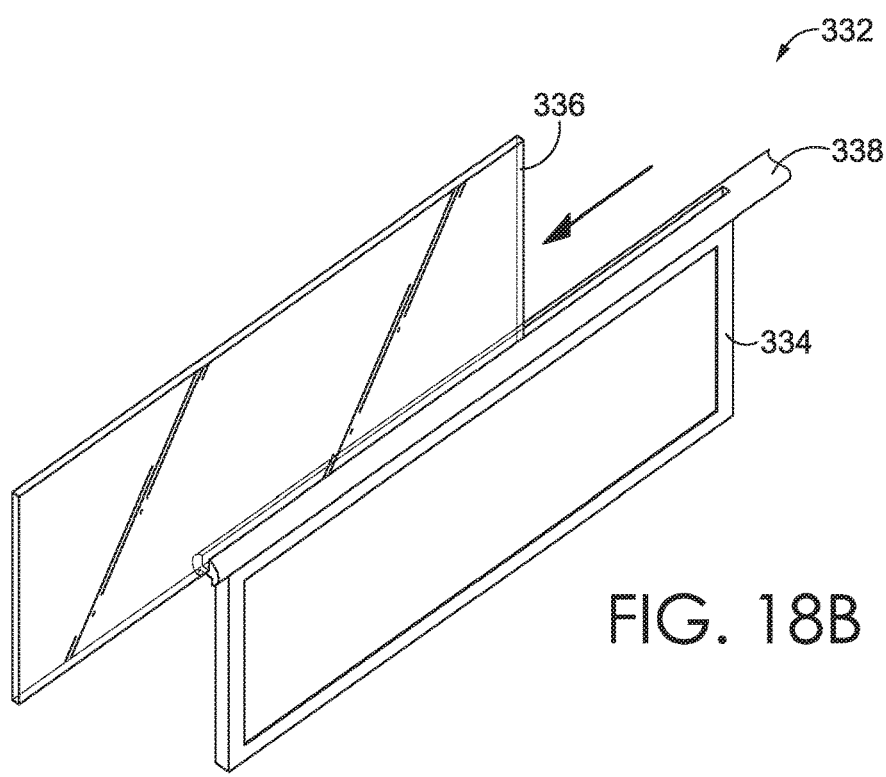

Referring to FIGS. 18A-18B, a display module 332 having first and second display portions 334, 336 is provided, in accordance with an embodiment of the present technology. In FIGS. 18A-18B, the first display portion 334 is non-transparent (e.g., a micro display, which may comprise at least one of a LCD, LED display, OLED display, DLP display, etc.) and the second display portion 336 is transparent, partially transparent, and/or selectively transparent (e.g., a waveguide optic for providing an augmented reality display). The first and second display portions 334, 336 are coupled such that they are coplanar to each other (they may also be at an angle as shown in FIGS. 17A-17B), and also, are attached to a releasable mount 338. The releasable mount 338 allows one or both of the first and second display portions 334, 336 to be independently interchangeable, allowing customization of a display characteristic of the display module 332.

Figure 19:
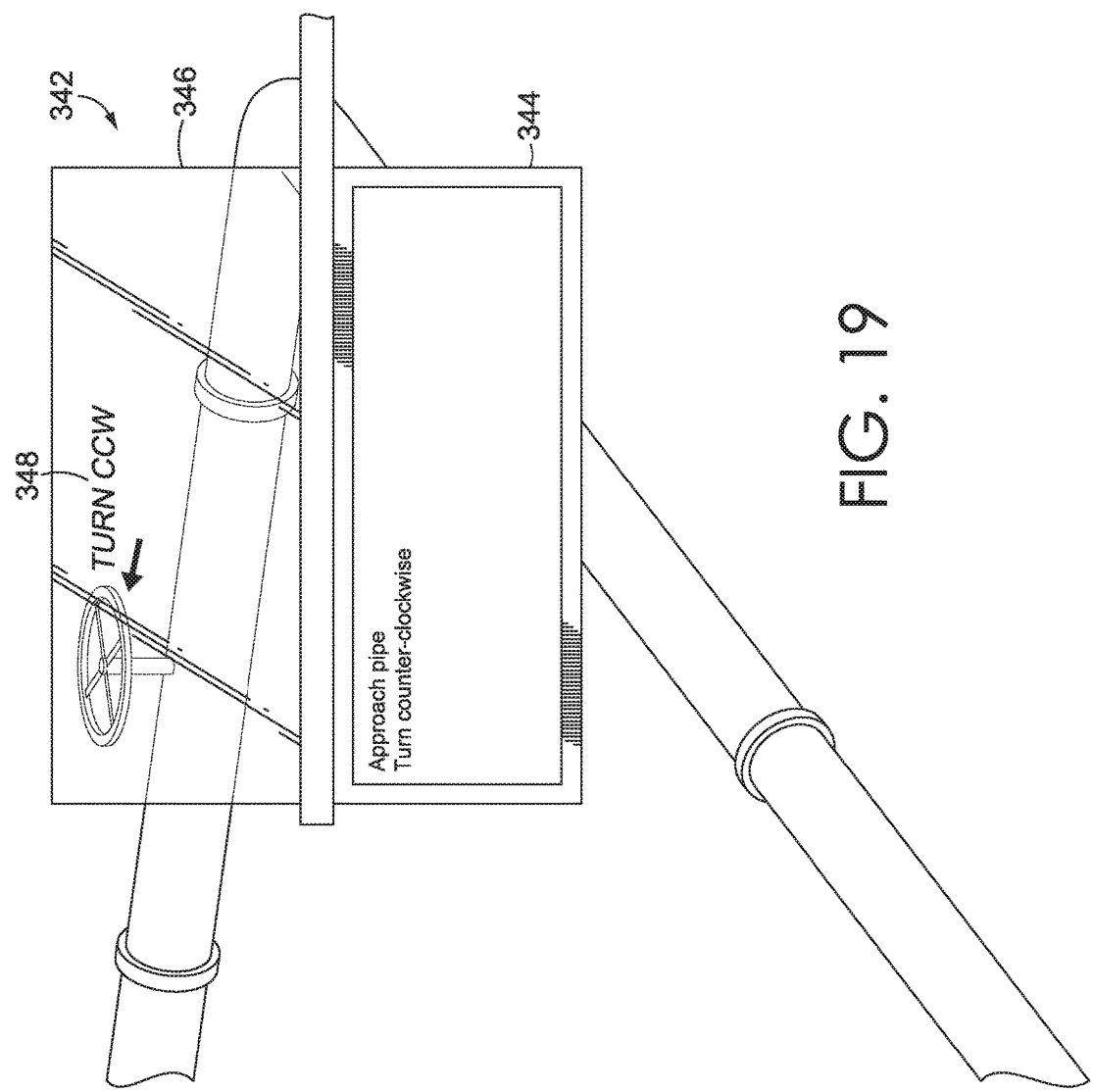
FIG. 19 depicts a display module having first and second display portions that provide different viewing states, in accordance with an embodiment of the present technology.

Referring to FIG. 19, a display module 342 having first and second display portions 344, 346 (i.e., a dual-display) is provided, in accordance with an embodiment of the present technology. The first display portion 344 is non-transparent (e.g., a micro display, which may comprise at least one of a LCD, LED display, OLED display, DLP display, etc.) and is shown displaying text for a user to view at one viewing angle, and the second display portion 346 is coupled to the first display portion 344 and is at least partially transparent (e.g., a waveguide optic) and is showing a combination of a user-viewed environment and displayed text/objects 348 at a second viewing angle (i.e., an augmented reality display). The augmented reality display provides an interactive display of information, and may be used in conjunction with audible instructions provided concurrently from one or more computer processors of an associated head-mounted display. In FIG. 19, the second display portion 346 is above the first display portion 344 relative to a user's field of view.

Figure 20A:
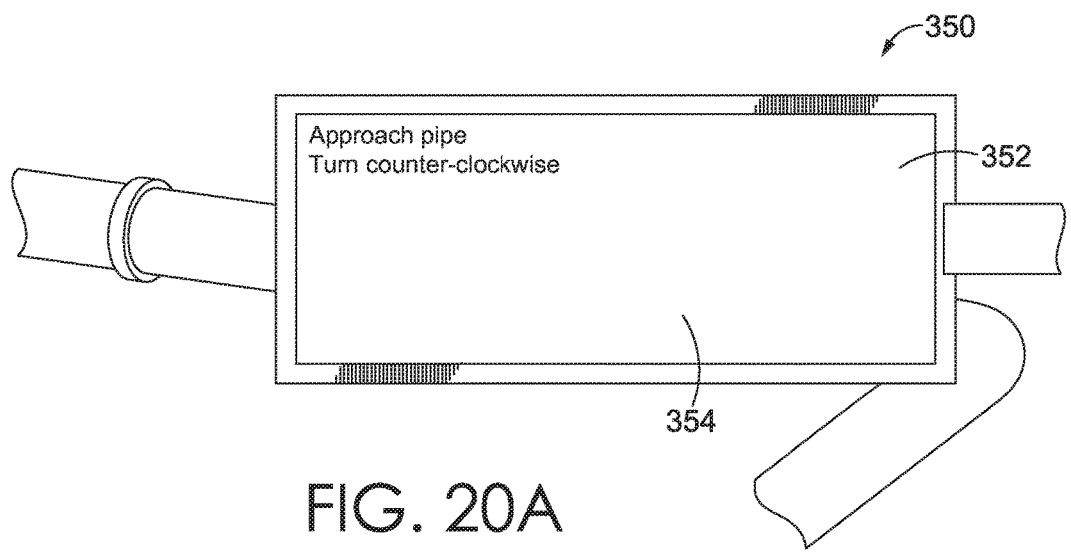
FIGS. 20A-20B depict a display module with a common display portion providing different viewing states, in accordance with an embodiment of the present technology.
Figure 20B:
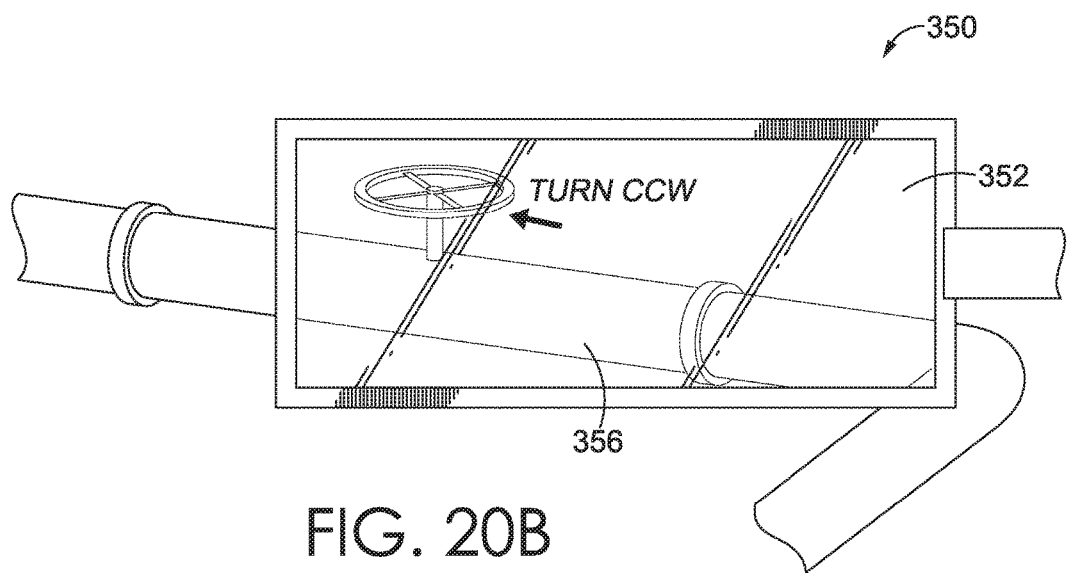

Referring to FIGS. 20A-20B, a display module 350 configured to provide multiple viewing states on a common display portion 352 is provided, in accordance with an embodiment of the present technology. The display module 350 shown in FIGS. 20A-20B is configured to go from a first state 354, as shown in FIG. 20A, that is non-transparent (e.g., providing black text on a white background) to a second state 356, as shown in FIG. 20B, that is at least partially transparent (e.g., an augmented reality display). This configuration allows multiple viewing states (e.g., one for reviewing a document and one for seeing a real-time display of the instructions from the document in the context of the actual environment viewed by the user) to be viewed interchangeably during use of an associated head-mounted display.

Figure 21:
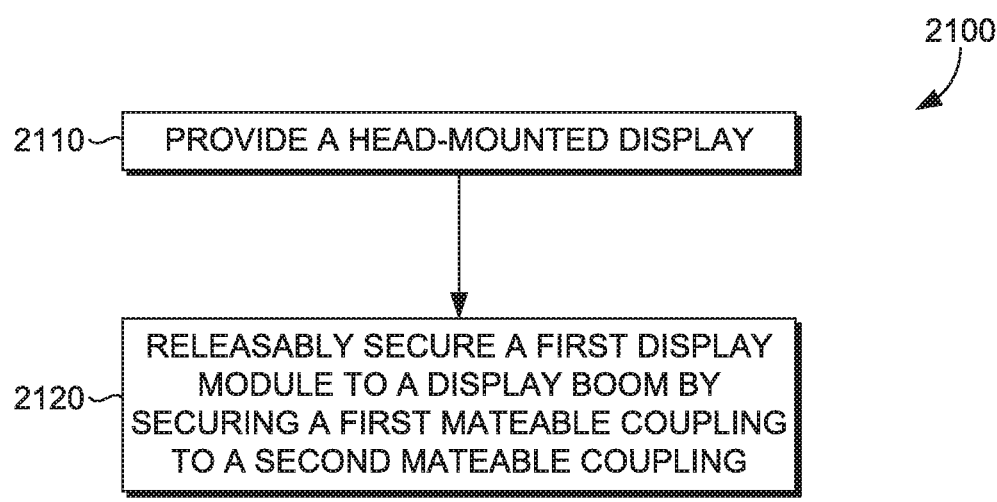
FIG. 21 is a block diagram of an exemplary method of adjusting a head-mounted display, in accordance with an embodiment of the present technology.

Referring to FIG. 21, a block diagram of an exemplary method 2100 of adjusting a head-mounted display is provided, in accordance with an embodiment of the present technology. At a block 2110, a head-mounted display, such as the head-mounted display 20 shown in FIGS. 2A-2B, is provided. The head-mounted display may comprise a display boom, such as the display boom 26 shown in FIGS. 2A-2B, having a first end and a second end, such as the first end 44 and the second end 46 shown in FIGS. 2A-2B, the display boom movably coupled to a base, such as the base 28 shown in FIGS. 2A-2B, located at the second end, one or more computer processors, a power source, a first display module, such as the display module 24 shown in FIGS. 2A-2B, configured to provide multiple viewing states, and a releasable coupling, such as the releasable coupling 48 shown in FIGS. 2A-2B, comprising a first mateable coupling, such as the first mateable coupling 50 shown in FIGS. 2A-2B, and a second mateable coupling, such as the second mateable coupling 52 shown in FIGS. 2A-2B. The first mateable coupling may be located at the first end of the display boom, and the second mateable coupling may be located on the first display module. At a block 1120, the first display module is releasably secured to the display boom by securing the first mateable coupling to the second mateable coupling.

The present technology has been described in relation to particular embodiments, which are intended in all respects to be illustrative rather than restrictive. Alternative embodiments will become apparent to those of ordinary skill in the art to which the present technology pertains without departing from its scope. Different combinations of elements, as well as use of elements not shown, are possible and contemplated.

What is claimed is:

1. A modular head-mounted display, comprising:
   one or more computer processors housed in a body of the head-mounted display and operable to provide for display visual data to one of a set of interchangeable display modules when coupled thereto;
   a display boom having:
   a first end adjustably coupled to the body, and
   a second end having:
      a first coupling member that presents at least a first interface coupled to the one or more computer processors, and
      a releasing mechanism operable for disengaging one of the set of interchangeable display modules from the second end of the display boom when coupled thereto;
   a first interchangeable display module from the set of interchangeable display modules having:
   a first display, and
   a second coupling member that compliments the first coupling member, the second coupling member presenting at least a second interface coupled to the first display,
   wherein at least the first and second interfaces are adapted to communicatively couple the first interchangeable display module to the one or more computer processors when the first coupling member is removably secured to the second coupling member, and
   wherein the first coupling member and the second coupling member, when removably secured to each other, provide an end-to-end connection between the second end of the display boom and an end of the first interchangeable display module.

2. The modular head-mounted display of claim 1, wherein the first coupling member is removably secured to the second coupling member with one or more magnets located on the first coupling member and/or the second coupling member.

3. The modular head-mounted display of claim 1, wherein the first end of the display boom is releasably coupleable to the body.

4. The modular head-mounted display of claim 1, wherein the first coupling member is coupled to the second end of the display boom via a ball joint.

5. The modular head-mounted display of claim 1, wherein the first interchangeable display module is configured to provide multiple viewing states and includes a first display portion coupled to a second display portion in a non-overlapping configuration, the first display portion comprising a non-transparent micro-display that provides a first viewing state and the second display portion comprising a waveguide optic that provides a second viewing state.

6. A modular head-mounted display, comprising:
   a mounting portion comprising one or more computer processors;
   a display boom comprising:
   a first end, and
   a second end,
   the first end comprising a first coupling member and a first interface communicatively connected to the one or more computer processors,
   the second end movably coupled to the mounting portion; and
   a display module, comprising:
   a display portion,
   a second coupling member that compliments the first coupling member, and
   a second interface communicatively connected to the display portion,
   wherein, when the first coupling member and the second coupling member are releasably coupled to each other, an end-to-end connection is formed between the first end of the display boom and an end of the display module, connecting the second interface to the first interface.

7. The modular head-mounted display of claim 6, wherein the display module is adapted to provide multiple powered viewing states each having a different display characteristic.

8. The modular head-mounted display of claim 7, wherein the display module comprises a first display portion configured to provide a first display characteristic and a second display portion configured to provide a second display characteristic.

9. The modular head-mounted display of claim 6, further comprising a releasing mechanism operable for disengaging the display module from the display boom by disconnecting the first coupling member and the second coupling member.

10. The modular head-mounted display of claim 8, wherein the first display portion and the second display portion provide non-overlapping fields of view, and wherein the first display portion and the second display portion are selectively useable.

11. The modular head-mounted display of claim 8, wherein the first display portion comprises a non-transparent display and the second display portion comprises a display that is at least partially transparent.

12. A modular head-mounted display, comprising:
   a mounting portion having one or more processors housed at least partially therein;
   a display boom having a first end and a second end, the second end of the display boom being movably coupled to the mounting portion; and
   an interchangeable display module adapted to be releasably secured to the first end of the display boom, the interchangeable display module including a first display portion and a second display portion that are coupled to each other in non-overlapping fashion, wherein the first display portion is configured to provide a first powered display state and the second display portion is configured to provide a second powered display state, wherein the first powered display state is a non-transparent display state and the second powered display state is an at least partially transparent display state, and wherein the interchangeable display module is configured to selectively provide the first powered display state or the second powered display state.

13. The modular head-mounted display of claim 12, wherein the interchangeable display module is adjustably secured to the first end of the display boom.

14. The modular head-mounted display of claim 12, wherein the second display portion comprises a waveguide optic that is operable to change at least a display portion, wherein the second display portion is positioned above the first display portion when the head-mounted display is in an as-worn configuration.

15. The modular head-mounted display of claim 12, wherein the first powered display state and the second powered display state are interchangeably activated by rotating the interchangeable display module.

16. The modular head-mounted display of claim 12, further comprising a camera communicatively coupled to the one or more computer processors.

17. The modular head-mounted display of claim 6, wherein the display module is pivotable when releasably coupled to the first end of the display boom.

18. The modular head-mounted display of claim 1, wherein the first and second coupling members comprise a male-female connection assembly, and wherein the releasing mechanism comprises a pair of depressible buttons positioned on opposite sides of the display boom that are adjacent to a surface of the display boom on which the first coupling member is located.

19. The modular head-mounted display of claim 1, wherein one or more electronic components of the head-mounted display remain in active operation when the first interchangeable display module is detached from the first interface coupled to the one or more computer processors.

20. The modular head-mounted display of claim 19, wherein the one or more electronic components include at least one of:
the one or more computer processors;
a wireless communication component;
a position-tracking component;
a microphone; and
a speaker.

* * * * *